United States Patent
Mathew

(10) Patent No.: US 11,157,298 B2
(45) Date of Patent: Oct. 26, 2021

(54) METHOD AND SYSTEM FOR AUTOMATICALLY INVOKING FUNCTIONALITY WHILE USING A PRIMARY APPLICATION WITHOUT USER ACTION

(71) Applicant: salesforce.com, inc., San Francisco, CA (US)

(72) Inventor: Pranoy Cherian Mathew, Andhra Pradesh (IN)

(73) Assignee: salesforce.com, inc., San Francisco, CA (US)

( * ) Notice: Subject to any disclaimer, the term of this patent is extended or adjusted under 35 U.S.C. 154(b) by 295 days.

(21) Appl. No.: 16/417,831

(22) Filed: May 21, 2019

(65) Prior Publication Data

US 2020/0371825 A1 Nov. 26, 2020

(51) Int. Cl.
| | |
|---|---|
| *G06F 9/46* | (2006.01) |
| *G06F 9/455* | (2018.01) |
| *G06N 5/02* | (2006.01) |
| *G06F 40/30* | (2020.01) |
| *G06F 9/451* | (2018.01) |

(52) U.S. Cl.
CPC .......... *G06F 9/45512* (2013.01); *G06F 40/30* (2020.01); *G06N 5/02* (2013.01); *G06F 9/451* (2018.02)

(58) Field of Classification Search
CPC ...... G06F 9/45512; G06F 40/30; G06F 9/451; G06N 5/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

*Primary Examiner* — Wissam Rashid
(74) *Attorney, Agent, or Firm* — LKGlobal | Lorenz & Kopf, LLP

(57) ABSTRACT

Methods and systems are provided for automatically determining a need to invoke functionality of a feature of an application while using a primary application and for automatically invoking that functionality without user action. An invoker module receives, from a sender process at a user system, input information that is input into a primary application via a user interface of the user system. The invoker module can process the input information to extract a text string of text from the input information, and based on the extracted text, can generate a command to automatically invoke functionality of the feature of the application without user action. An action module can then execute the command to generate an action that automatically invokes the functionality of the feature of the application without user action.

17 Claims, 11 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,007,897 B2 * | 6/2018 | Possing ................ G06Q 10/109 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

| APPLICATION BEING USED AT USER SYSTEM | INPUT INFORMATION INDICATIVE OF | COMMAND | ACTION |
|---|---|---|---|
| E-MAIL | CONTACT X, Y, Z TO FOLLOW-UP | CREATE NEW E-MAIL TO ADDRESSED TO XYZ | OPEN NEW WINDOW WITH E-MAIL ADDRESSED TO XYZ |
| E-MAIL | MEETING WITH A, B, C | CREATE NEW MEETING INVITE ADDRESSED TO A, B and C | OPEN NEW WINDOW WITH A NEW MEETING INVITE ADDRESSED TO A B and C |
| WORD PROCESSOR | PROPOSE MEETING FOR JANUARY 1, 2019 AT 11AM WITH JOE OLSEN | CREATE NEW MEETING INVITE FOR JANUARY 1, 2019 AT 11AM ADDRESSED TO JOE OLSEN | OPEN A NEW WINDOW WITH A NEW MEETING INVITE FOR JANUARY 1, 2019 AT 11AM ADDRESSED TO JOE OLSEN |
| WORD PROCESSOR | CREATE A LETTER ADDRESSED TO A POTENTIAL BUSINESS CONTACT | CREATE NEW CONTACT IN CRM SYSTEM | OPEN A NEW WINDOW WITH A TEMPLATE FOR CREATING A CONTACT IN A CRM SYSTEM WITH CONTACT NAME, ADDRESS, AND OTHER INFORMATION PRE-POULATED WITH INFORMATION FROM LETTER |
| CALENDAR | APPOINTMENT CREATED ON JANUARY 1, 2019 AT 1 PM | CANCEL MEETING WITH X AND Y ON JANUARY 1, 2019 AT 1 PM | OPEN NEW WINDOW WITH E-MAIL ADDRESSED TO X AND Y AND OPEN ANOTHER NEW WINDOW WITH ORIGINAL MEETING INVITE ADDRESSED TO X AND Y FOR RE-SCHEDULING |
| TEXT APPLICATION ON SMARTPHONE | WILL SEE YOU AT 8 PM FOR DINNER AT RUTH'S CHRIS STEAK HOUSE | CREATE NEW MEETING INVITE FOR 8 PM ADDRESSED TO TEXT RECIPIENT WITH MAP LINK INSERTED IN BODY OF THE MEETING INVITE | OPEN A NEW WINDOW WITH A NEW MEETING INVITE FOR 8 PM ADDRESSED TO TEXT RECIPIENT WITH MAP LINK INSERTED IN BODY OF THE MEETING INVITE |

TABLE 1 – EXAMPLE USE CASES

FIG. 7

METHOD AND SYSTEM FOR AUTOMATICALLY INVOKING FUNCTIONALITY WHILE USING A PRIMARY APPLICATION WITHOUT USER ACTION

TECHNICAL FIELD

Embodiments of the subject matter described herein relate generally to application software, and techniques and technologies for automatically invoking features of an application. More particularly, embodiments of the subject matter relate to an automated method and system for automatically determining a need to automatically invoke functionality, while using a primary application and for automatically invoking that functionality without a user needing to take action or leave the context of the primary application.

BACKGROUND

An application is any program, or group of programs, that is designed for the end user. Applications sit on top of systems software because they are unable to run without the operating system and system utilities. Systems software consists of low-level programs that interact with the computer at a very basic level. This includes operating systems, compilers, and utilities for managing computer resources. Examples of common applications software (or end-user programs) include such things as word processors, email applications, calendar applications, spreadsheets, web applications, database programs, software-as-a-service (SaaS) applications such as customer-relationship management (CRM) applications, web browsers, development tools, mobile applications, image editors and communication platforms.

When a user is using an application there may be a need to open another application or a feature of that application to perform additional tasks that relate to what the user is doing in main or primary application that they are currently using. For example, a user may be using an email application to write an email to other users, and while writing the email might need to open a calendar application to schedule a meeting or appointment that is related to the topic being written about in the email application.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 is a table that summarizes some non-limiting examples a primary application being used at user system, input information that is input into the primary application, and commands generated by invoker module to cause the action module to invoke an action in accordance of the disclosed embodiments.

DETAILED DESCRIPTION

Figure 1:
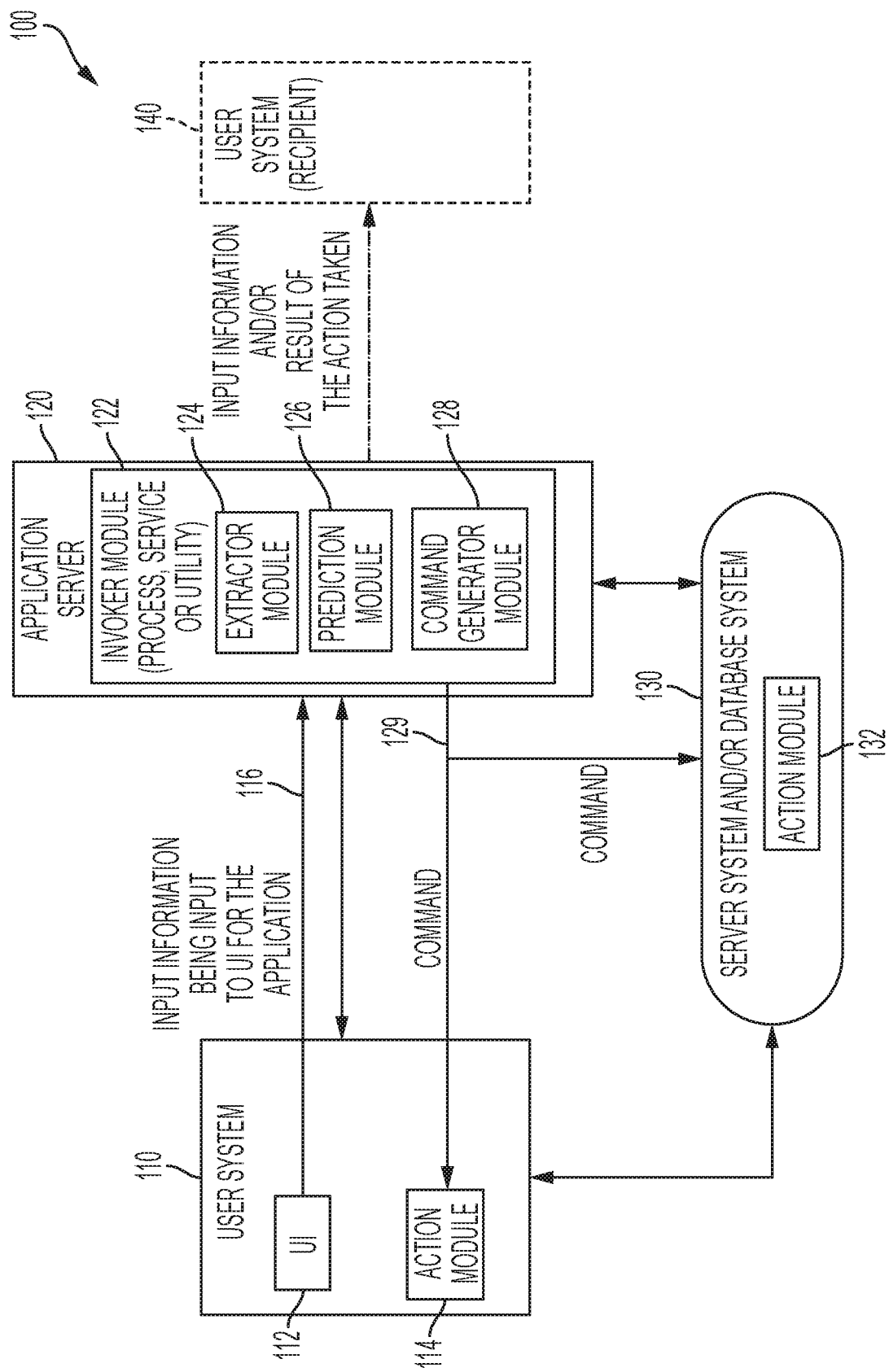
FIG. 1 is an example of a system in accordance with the disclosed embodiments.

When a user is working in the context of an application to complete a task that they are currently working on in that application, it can be disruptive for the user to invoke other functionality (e.g., switch to another application or another feature of that application). For instance, the user may have to open another application, enter information into that application to complete a task in that application, etc. and then switch back to the primary application that they were originally working in. This can be inconvenient, time-consuming, and disruptive to the user's train of thought.

Embodiments of the subject matter described herein relate generally to application software, and techniques and technologies for automatically invoking an application without leaving the context of another application. More particularly, embodiments of the subject matter relate to an automated method and system for automatically determining a need to automatically invoke functionality, while using a primary application and for automatically invoking that functionality without a user needing to take actions or leaving the context of the primary application. A system and technologies in accordance with the disclosed embodiments can be used to process input information that is input into a primary application, and automatically generate commands to cause an action module to automatically invoke an action in the same or another different application on behalf of a user. For example, in one implementation, an automated method and system are provided for automatically determining a need to automatically invoke functionality of a secondary application, while using a primary application and for automatically invoking the secondary application without taking user actions or leaving the context of the primary application.

In one embodiment, a method is provided for automatically determining a need to invoke functionality of a feature of an application, service, or utility while using a primary application and for automatically invoking that functionality without user action. In accordance with the method, input information, that is input into a primary application via a user interface of a user system is received by an invoker module from a sender process at the user system. In one embodiment, the invoker module can be executed at a hardware-based processing system of an application server system that is communicatively coupled to the user system.

The invoker module can process the input information to extract a text string of text from the input information, and based on the extracted text, can generate a command to automatically invoke functionality of the feature of the application without user action. Another hardware-based processing system can execute the command to generate an action that automatically invokes the functionality of the feature of the application without user action. The feature of the application can be a feature of the primary application, or a feature of another application that is different than the primary application. For example, in one implementation, the functionality that is automatically invoked by the action can include things such as automatically opening a window of the application, and/or auto-populating certain items within the window with information to help expedite completion of a task. Alternatively, the feature of the application that is invoked could be a service or a feature of a service, a utility or a feature of a utility, or a feature of another distinct computing process.

In one implementation, the invoker module can process the input information to determine contextual information from the input information, and use a set of associative rules to generate a prediction result output that corresponds to the contextual information for a given context. For example, patterns from the contextual information that indicate that functionality of the feature of the application is to be invoked can be extracted, and then each of the set of associative rules can be evaluated by determining whether extracted patterns from the contextual information match a pattern defined by associative data for that associative rule. One of the associative rules that is identified as having a matching pattern (with the patterns from the contextual information) can then be used to generate the prediction result output. Then, based on the prediction result output, the command to automatically invoke the functionality of the feature of the application without user action can be automatically generated by matching the prediction result output to an entry in a library that is mapped to the command. In this implementation, the command corresponds to the prediction result output In one embodiment, an invoker module can be executed by a processor to perform near real-time analysis of data as the user enters data into an application at the user system, predict actions that the user would likely take (e.g., infer the user's intent based on the data that is being input), and generate commands to automatically invoke functionality on behalf of the user. The user can observe the results of an action being taken to invoke the functionality in a nearly immediate manner.

In another embodiment, the invoker module can process the input information and attempt to detect or identify a pre-fix that occurs before the text string. The pre-fix serves as a signal that information/text that follows that pre-fix indicates the functionality that needs to be automatically invoked. The invoker module can then extract the text string that follows the pre-fix by performing a matching analysis against a library of keywords and extracting a matching keyword. The matching keyword can then be matched to an entry that is mapped to the command to automatically invoke the functionality of the feature of the application without user action.

In another embodiment, a system is provided for automatically determining a need to invoke functionality of a feature of an application (or alternatively of a service or utility), while using a primary application, and for automatically invoking that functionality without user action. The system includes a user system that is configured to execute the primary application and an application server system communicatively coupled to the user system. The user system is configured to receive input information that is input into the primary application via a user interface. The application server system includes a hardware-based processing system, and an invoker module that can be executed by the hardware-based processing system. The invoker module is configurable to cause: receiving the input information from a sender process at the user system; processing of the input information at an extractor module to extract a text string from the input information, wherein the text string comprises extracted text; and generating, at a command generator module based on the extracted text, a command to automatically invoke functionality of the feature of the application without user action. An action module can be when executed by another hardware-based processing system (e.g., at the user system, or at a server system, or at a database system). The action module is configurable to cause the action by executing the command to generate an action that automatically invokes the functionality of the feature of the application without user action. For instance, the action is the result of processing the command to automatically invoke certain functionality of the feature of the application, for example, by an API call or a microservice. The feature of the application that is invoked can be a feature of the primary application, or a feature of another application that is different than the primary application. The functionality of the feature of the application that is automatically invoked by the action can include, for example, automatically opening a window of the application, auto-populating certain items within the window with information to help expedite completion of a task, etc.

In one embodiment, the invoker module can include a prediction module that can process the input information to determine contextual information from the input information, and use a set of associative rules to generate a prediction result output that corresponds to the contextual information for a given context. For example, the invoker module, when executed by the hardware-based processing system, can extract patterns from the contextual information that indicate that functionality of the feature of the application is to be invoked; evaluate each of the set of associative rules by determining whether extracted patterns from the contextual information match a pattern defined by associative data for that associative rule; and use one of the associative rules, that is identified as having a matching pattern with the patterns from the contextual information, to generate the prediction result output. In this embodiment, the command generator module can generate, based on the prediction result output, the command to automatically invoke the functionality of the feature of the application without user action. For instance, the command can be generated by matching the prediction result output to an entry in a library that is mapped to the command. In other words, the command corresponds to the prediction result output.

In another embodiment, the invoker module, when executed by the hardware-based processing system, can identify, at a pre-fix detector module, a pre-fix that occurs before the text string. The pre-fix serves as a signal to the extractor module that information that follows that pre-fix indicates the functionality that needs to be automatically invoked. The invoker module can then extract, at a keyword extractor module, the text string that follows the pre-fix by performing a matching analysis against a library of keywords and extracting a matching keyword. The command generator module can then match the matching keyword to an entry that is mapped to the command to generate a command to automatically invoke the functionality of the feature of the application without user.

FIG. 1 is an example of a system 100 in accordance with the disclosed embodiments. The system 100 includes a user system 110, an application server 120, a server system 130 and/or database system 130 (that will be referred to herein as a server/database system 130), and optionally another user system 140. In the description that follows, to distinguish between the user systems, the user systems will be referred to as a first user system 110 and a second user system 140. It should be appreciated that while FIG. 1 illustrates a simplified example with two user systems and a single application server, any number of user systems and application servers can be included in a practical implementation. In addition, although the application server 120 and the server/database system 130 are shown separately, in another embodiment, the application server 120 and server/database system 130 can be implemented together as part of one system. For instance, the application server 120 can be part of the server/database system 130 in some implementations.

The user systems 110, 140 can be any type of computer is capable of connecting to and communicating messages over a data communication network (not illustrated). The data communication network can include the application server 120 and the server/database system 130 among many other things. For example, the user systems can be a handheld computing device, a mobile phone, a laptop computer, a work station, and/or a network of computing devices. The data communication network (not illustrated for sake of clarity) that user systems communicate over can be any one or any combination of a local area network (LAN), wide area network (WAN), telephone network, wireless network, point-to-point network, star network, token ring network, hub network, or other appropriate configuration. The data communication network provides and supports data connectivity between the user systems 110, 140 and a system that includes the application server 120 and the server/database system 130. In practice, the data communication network may be any digital or other communications network capable of transmitting messages or data between devices, systems, or components. In certain embodiments, the data communication network includes a packet switched network that facilitates packet-based data communication, addressing, and data routing. The packet switched network could be, for example, a wide area network, the Internet, or the like. In various embodiments, the data communication network includes any number of public or private data connections, links or network connections supporting any number of communications protocols. The data communication network may include the Internet, for example, or any other network based upon a transfer control protocol and Internet protocol (TCP/IP) or other conventional protocols. That network will be used in many of the examples herein. However, it should be understood that the networks used with the embodiment described herein use are not so limited, although TCP/IP is a frequently implemented protocol. In various embodiments, the data communication network could also incorporate a wireless and/or wired telephone network, such as a cellular communications network for communicating with mobile phones, personal digital assistants, and/or the like. The data communication network may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

Depending on the implementation, the application server 120 can be an on-premise application server, or a hosted application server system, for example, that is part of an application platform (e.g., cloud-based computing platform) that serves the application(s) to the user system(s). In this regard, the application server 120 may be implemented using one or more actual and/or virtual computing systems that collectively provide a platform for serving applications to the user systems. The application server 120 operates with any sort of conventional processing hardware, such as one or more processor(s), memory, input/output features and the like. The input/output features generally represent the interface(s) to networks (e.g., to the Internet, or any other local area, wide area or other network), mass storage, display devices, data entry devices and/or the like. The processor(s) may be implemented using any suitable processing system, such as one or more processors, controllers, microprocessors, microcontrollers, processing cores and/or other computing resources spread across any number of distributed or integrated systems, including any number of "cloud-based" or other virtual systems. The memory represents any non-transitory short or long term storage or other computer-readable media capable of storing programming instructions for execution on the processor, including any sort of random access memory (RAM), read only memory (ROM), flash memory, magnetic or optical mass storage, and/or the like. Computer-executable programming instructions, when read and executed by the processor of the application server 120, cause the processor of the application server 120 to create, generate, or otherwise facilitate generation of commands 129 that are sent to the user system 110 and/or server/database system 130. The implementation of the server system 130 and/or database system 130 can vary, and examples will be described below with reference to FIGS. 8-11. As will be described below, the commands can cause an action module at the user system 110 and/or server/database system 130 to invoke or perform one or more additional actions tasks, operations, functions, and/or processes described herein.

The first user system 110 includes a user interface (UI) 112 and an action module 114. As a user (not shown) of the first user system 110 interacts with an application, the user can input information into the application via the UI 112. The user can input the input information using a keyboard or other physical input device that can used to input information such as a key pad, microphone, sound card, touch screen, touch pad, mouse, pointing device, light pen, camera, web camera, video card, etc. The application that the user is interacting with can be served from application server 120, or in the alternative, could be executed locally at the first user system 110. The application can be any type of application that receives input information that is input by a user using a user interface of the first user system 110. For example, the application could be: an email application, a messaging application, a SMS message application, a text message application, a chat message application, a voice message application, P2P message application, a word processing application, a calendar application, a resource management application, a productivity application, a scheduling application, a time management application, a collaboration application, an educational application, a social media application, an enterprise resource planning (ERP) application, a customer relationship management (CRM) application, a project management application, a spreadsheet application, database applications, a resource management application, etc.

In one embodiment, the first user system 110 sends the input information 116 that is being input into the application (via the UI 112) to the application server 120. The application server 120 includes an invoker module 122 that can be executed by a processing system (not shown in FIG. 1) of the application server 120. In one embodiment, the invoker module 122 can be implemented as a process, service or utility. The invoker module 122 includes an extractor module 124, a prediction module 126, and a command generator module 128. As will be described in greater detail below, the extractor module 124 and the prediction module 126 can both be implemented in one embodiment, however, in other embodiments either the extractor module 124 or the prediction module 126 can be implemented.

The extractor module 124 can process the input information 116 to extract a text string from the input information 116, and then provide the extracted text to the command generator module 128. For example, in one implementation, the extractor module 124 can search the input information 116 to detect or identify a certain pre-fix that occurs before a text string and then extract that text string that follows. The pre-fix serves as a signal to the extractor module 124 that information that follows that pre-fix indicates some type of functionality that needs to be automatically invoked. The command generator module 128 can then can then process the extracted text string to generate, based on the extracted text sting, a command 129. This can be done, in one embodiment, by matching the extracted text sting to an entry in a file, library or database, where each entry is mapped to a corresponding command. Depending on the implementation, the corresponding command 129 can then be sent to either the action module 114 that is hosted at the first user system 110, or to the action module 132 that is hosted at the server/database system 130.

On the other hand, in another embodiment, the prediction module 126 can process the input information 116 to determine context of the input information 116 (or contextual information). Then, based on the contextual information, the prediction module 126 can use, for example, a bank of associative rules to generate a prediction result output (not shown). The prediction result output represents a predicted action for a given context. The prediction result output is sent to the command generator module 128, where it can be processed at the command generator module 128 to generate a corresponding command 129 (e.g., a command that corresponds to that particular prediction result output). The command generator module 128 can generate, based on the prediction result output, a command 129 by matching the prediction result output to an entry in a file, library or database, where each entry is mapped to a corresponding command. Depending on the implementation, the corresponding command 129 can then be sent to either the action module 114 that is hosted at the first user system 110, or to the action module 132 that is hosted at the server/database system 130.

The first user system 110 and/or the server/database system 130 can include an action module 114 and an action module 132, respectively. Depending on the implementation, the command 129 can be sent to either the action module 114 that is hosted at the first user system 110, or to the action module 132 that is hosted at the server/database system 130. In other words, depending on the implementation, the command 129 that is generated by the command generator module 128 can be sent to either an action module 114 at the first user system 110, or to an action module 132 at the server/database system 130. Both of the action modules action module 114, 132 operate in a similar manner in that they process the command 129 to generate an action that corresponds to the command. In other words, regardless of the implementation, either action module can then process the command 129 to generate an action that corresponds to the command.

For instance, the action module 132 at the server/database system 130 can process the command 129 to generate an action at the server/database system 130, or can process the command 129 to cause an action at either the first user system 110 or the application server 120. Likewise, the action module 114 at the first user system 110 can process the command 129 to generate an action at first user system 110, or can process the command 129 to cause an action at either the application server 120 or the server/database system 130.

An action can refer to a result of processing a command to automatically invoke certain functionality of an application, process, service or utility, for example, via an API call or a microservice. The functionality is automatically invoked without requiring further action by the user and without the user having to leave the context of the application that the user is currently interacting with or was interacting with via the UI 112 to generate the input information 116. For example, an action can refer to automatically invoking functionality associated with another application (e.g., another application other than the application that the user is currently interacting with or was interacting with via the UI 112 to generate the input information 116). For instance, the action could be automatically causing an application to automatically invoke some functionality, such as, automatically opening a window corresponding to the action and/or auto populating certain items associated within the window that corresponds to that action. As a few non-limiting examples, the window could be a window for a calendar application that is used to schedule a meeting, a window of an email application, such as a window to compose an email or a window used to attach a file to an email that is being written, a window to create a CRM record, etc. Any of these windows could optionally be auto-populated with information to help expedite completion of a task. In some implementation, this information can be extracted from a primary application that the user is currently interacting with or was interacting with via the UI 112 to generate the input information 116. Some non-limiting examples will be described below with reference to FIG. 7. Tasks performed by the various elements in FIG. 1 will be described in greater detail below with reference to FIGS. 2-11, which will now be described with continued reference to FIG. 1.

Figure 2:
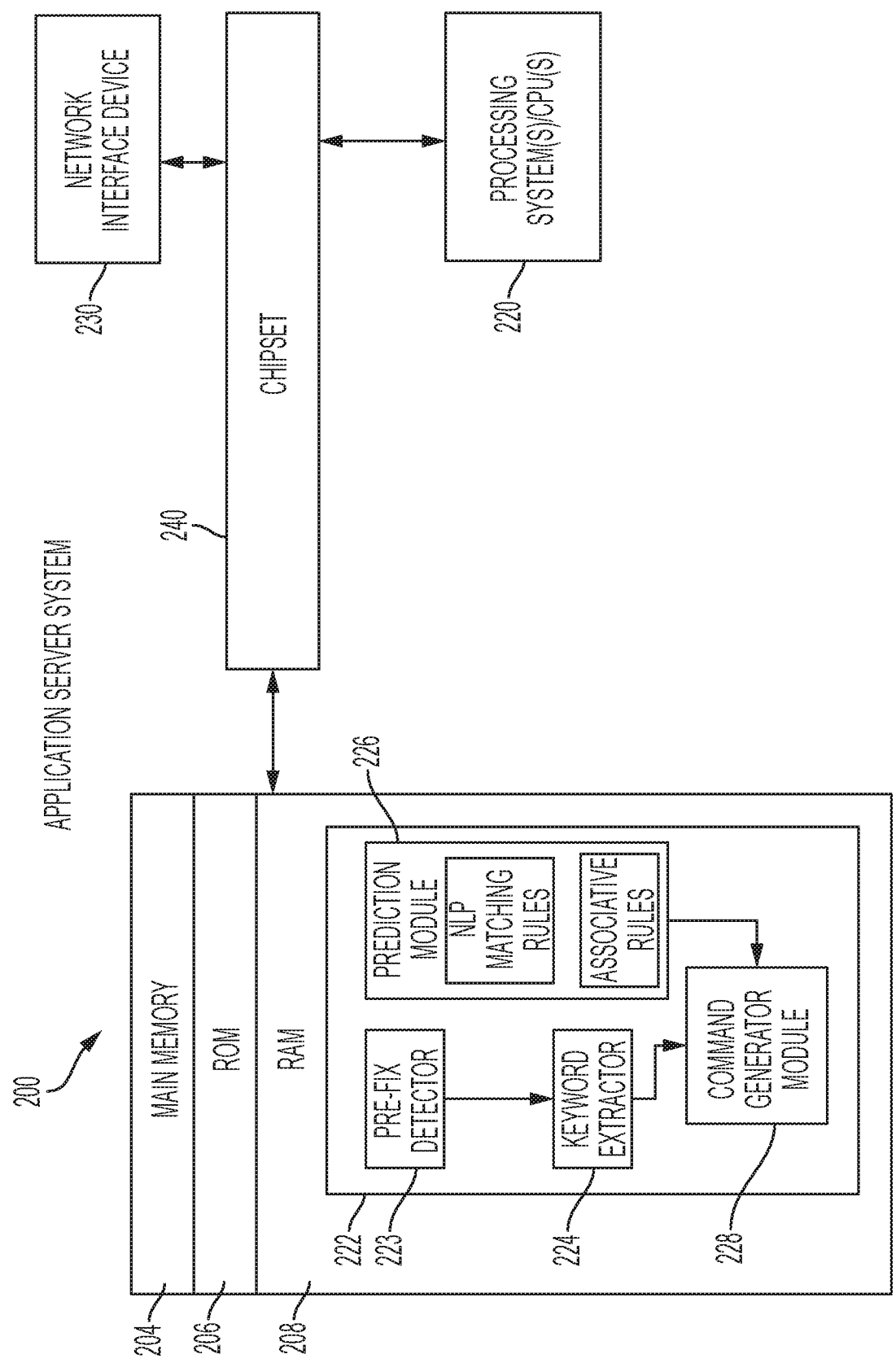
FIG. 2 is a schematic representation of an exemplary embodiment of application server in accordance with the disclosed embodiments.

FIG. 2 is a schematic representation of an exemplary embodiment of application server 200 in accordance with the disclosed embodiments. In one non-limiting embodiment, the application server 200 is suitable for use in a system such as that depicted in FIG. 1, and thus the application server 102 of FIG. 1 could be generally configured and implemented as shown in FIG. 2.

The illustrated embodiment of the application server 200 includes, without limitation: a main memory 204, one or more processing system(s) 220, a network interface device (NID) 230, and a chipset 240. It will be appreciated that the application server 200 may not include all of the components shown in FIG. 2, may include other components that are not explicitly shown in FIG. 2, or may utilize an architecture completely different than that shown in FIG. 2.

For example, the application server 200 may also include other input and output devices that are not illustrated in FIG. 2 for sake of simplicity.

The chipset 240 is usually located on a motherboard of the application server 200. The chipset 240 is a set of electronic components (e.g., in an integrated circuit) that interconnects and manages the data flow between the processing system(s) 220 and other elements of the application server 200. For instance, the chipset 240 provides an interface between the processing system(s) 220 and the main memory 204, and also includes functionality for providing network connectivity through the NID 230, such as a gigabit Ethernet adapter. The chipset 240 typically contains the processor bus interface (also known as a front-side bus), memory controllers, bus controllers, I/O controllers, etc.

The processing system(s) 220 communicates with main memory 204 and the NID 230 via chipset 240 and appropriate buses. Processing system(s) 220 represents one or more general-purpose processing devices such as a microprocessor, central processing unit, or the like. More particularly, the processing system(s) 220 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 220 may also be one or more special-purpose processing devices such as an application specific integrated circuit (ASIC), a field programmable gate array (FPGA), a digital signal processor (DSP), network processor, or the like.

The processing system(s) 220 can include one or more central processing units ("CPUs") that operate in conjunction with the chipset 240. The processing system(s) 220 perform arithmetic and logical operations necessary for the operation of the application server 200. The processing system(s) 220 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 230 is capable of connecting the application server 200 to other computers over the network 130. The network 130 can be an Ethernet or Gigabyte Ethernet LAN, a fiber ring, a fiber star, wireless, optical, satellite, a WAN, a MAN, or any other network technology, topology, protocol, or combination thereof. As such, the NID 230 allows the application server 200 to be connected (e.g., networked) to other machines in a LAN, an intranet, an extranet, or the Internet. In accordance with the disclosed embodiments, the application server 200 can receive information from a user system and relay that information to another user system 140 via the NID 230. As described above, the application server 200 can also communicate with the server/database system 130 via the NID 230 to store one or more components of various messages it receives and can also generate queries to check server/database system 130 for existence of stored components.

The chipset 240 can provide an interface to various forms of computer-readable storage media including a main memory 204 (e.g., read-only memory (ROM), flash memory, dynamic random access memory (DRAM) such as synchronous DRAM (SDRAM)), and storage devices (not illustrated). The processing system(s) 220 can communicate with the various forms for computer-readable storage media via the chipset 240 and appropriate buses.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 220) may be distributed throughout the application server 200.

The RAM 208 includes programs/instructions, and operating system software (not illustrated) that controls the operation of the application server 200 and manages computer hardware and software resources and provides common services for computer programs executed by the processing system(s) 220. Regardless of the implementation, the operating system includes many different "components" that make the different parts of the application server 200 work together.

The ROM of the main memory 204 can be used to store firmware that includes program code containing the basic routines that help to start up the application server 200 and to transfer information between elements within the application server 200. The ROM of the main memory 204 may also store other software components necessary for the operation of the application server 200 in accordance with the embodiments described herein.

The main memory 204 includes a computer-readable medium on which is stored one or more sets of instructions. For example, in one embodiment, the RAM 208 stores programs/instructions or executable code for one or more programs that can be loaded and executed at processing system(s) 220 to cause the processing system(s) 220 to perform various functions for an invoker module 222 that are described above with reference to FIG. 1 and below with reference to FIGS. 3-7. These computer-executable instructions specify how the processing system(s) 220 transition between states to perform various acts described functions that are described above with reference to FIG. 1 and below with reference to FIGS. 3-7.

For example, as explained above, the processing system(s) 220 of the application server 200 can access computer-readable storage media and execute computer-executable instructions stored therein to cause the application server 200 to execute code for an invoker module 222 (process/application/service/utility) including: a prefix detector module 223 that is optional, a keyword extractor module 224 that is also optional, a prediction module 226 that is also optional, and a command generator module 228 that generates a command to automatically invoke an action or other functionality.

In one embodiment, the prefix detector module 223 analyzes information being input into a user interface for an application, and detects a prefix when it is included in that input information. Whenever a prefix is detected, the prefix detector module 223 can send information that follows that prefix to the keyword extractor module 224. The keyword extractor module 224 processes the information that follows the prefix, for example, by performing a matching analysis against a library of keywords, and extracts a matching keyword. The command generator module 228 can then use a matching, extracted keyword from the keyword extractor module 224 to generate a generate a command that can then be processed by an action module to automatically invoke an action or other functionality.

In another embodiment, the prediction module 226 analyzes and processes information being input (e.g., user text or voice input) into a user interface of an application, and matches it to executable commands.

For example, in one embodiment, natural language understanding (NLU) or natural language interpretation (NLI) can be used to analyze the input information. Natural-language understanding (NLU) or natural-language interpretation (NLI) is a subtopic of natural-language processing (NLP) in artificial intelligence that deals with machine reading comprehension (e.g., content categorization, content recognition and/or content analysis). The term "natural-language understanding" can refer to a diverse set of computer applications and systems. A natural-language understanding system can include a lexicon of the language that is being processed, and a parser and grammar rules to break sentences into an internal representation. A natural-language understanding system can follow a semantic theory to guide comprehension. The interpretation capabilities of a language-understanding system depend on the semantic theory it uses. These range from naive semantics or stochastic semantic analysis to the use of pragmatics to derive meaning from context. Semantic parsers convert natural-language texts into formal meaning representations. Advanced applications of natural-language understanding also attempt to incorporate logical inference within their framework. This is generally achieved by mapping the derived meaning into a set of assertions in predicate logic, then using logical deduction to arrive at conclusions. Therefore, systems based on functional languages can include a subsystem to represent logical assertions, while logic-oriented systems generally rely on an extension of the built-in logical representation framework.

In another embodiment, the prediction module 226 analyzes information being input into a user interface of an application by processing that information using, for example, a set of associative rules to generate a prediction that is then sent to the command generator module 228. Based on the prediction from the prediction module 226, the command generator module 228 generates a command to automatically invoke an action or other functionality. The command generator module 228.

In one embodiment, stored associative rules can be analyzed to determine whether any of the contextual information matches a pattern defined by associative data for that associative rule. This allows for a set of stored associative rules to be identified that are applicable to the input information received from the UI. Each of the stored associative rules that were determined to have a pattern that matches the contextual information has a corresponding command. Based on the set of stored associative rules that are determined to be applicable, a set of predictions can be generated that are or could be applicable to the input information received from the UI.

As used herein, a rule-learning algorithm can refer to a computer implemented program that is capable of processing input information, and identifying characteristics (e.g., patterns) associated with that input information to identify one or more other actions that are of potential taken when a certain pattern is identified in the input information. In some embodiments, the rule-learning algorithm can also process other information to automatically identify characteristics (e.g., patterns) shared between input information and associated actions that subsequently occur when a particular pattern occurs.

An association rule-learning algorithm is a specific type of rule-learning algorithm. As used herein, an "association rule-learning algorithm" can refer to a computer implemented program that is capable of processing input information, identifying characteristics (e.g., patterns) associated with that input information, and generating associative rules that can be used to identify one or more other actions that are of potential taken when a certain pattern is identified in the input information. To generate the stored associative rules, an association rule-learning algorithm can be used to process contextual information to extract patterns from the contextual information, and based on each new pattern that gets extracted, a new associative rule can be generated. Each new associative rule can include associative data that reflects that new pattern, and corresponds or is linked to a prediction that corresponds to a command.

As used herein, an associative rule describes a pattern that links one or more data points together with one or more other data points so that they are associated and thus form an associative rule. In other words, each associative rule describes a pattern that links certain input information (data points) together so that they are associated with a command. As such, input information from a UI can be evaluated against each associative rule. If the input information satisfies or matches a pattern defined by that associative rule, then that associative rule can be used to generate a corresponding command.

In another embodiment, the prediction module 226 can include a number of analytics and deep learning algorithms, including statistical analysis and artificial neural networks (ANN). In general, the ANN can be a mathematical or computational model that can include a group of artificial neurons (units) that are interconnected. An ANN can be used to model complex relationships between inputs and outputs or to find patterns in data, where the dependency between the inputs and the outputs cannot be easily attained. The ANN can be an adaptive system that is configured to change its structure (e.g., the connections among the units) based on information that flows through the network during the learning phase.

As an alternative or in addition to the ANN, the prediction module 226 can include predictive models that use metric spaces, decision trees, and decision tree learning algorithms. A metric space can provide a "ruler" or an absolute measurement of how different two feature vectors are. The metric space can be used to define a "distance" between the two feature vectors. A decision tree can be a support tool that uses a tree-like graph or model of decisions and their possible consequences. The decision tree can include one or more leaf nodes (leaves) that represent final decisions. An entire path leading to one or more leaf nodes can represent a rule for arriving at one or more decisions, respectively. A decision tree learning algorithm can be an inductive machine learning mechanism that extrapolates accurate predictions about future events (unknown) from a given set of past (known) events. The decision tree learning algorithm can also provide a measure of confidence that the predictions are correct (e.g., a coverage rate, accuracy rate, and confidence interval).

Those are some non-limiting implementations of technologies that can be utilized by the prediction module 226 to generate commands. Various functions performed by the processing system(s) 220 upon loading and executing the instructions are described above with reference to FIG. 1 and will now be described in greater detail below with reference to FIGS. 3-7.

Figure 3:
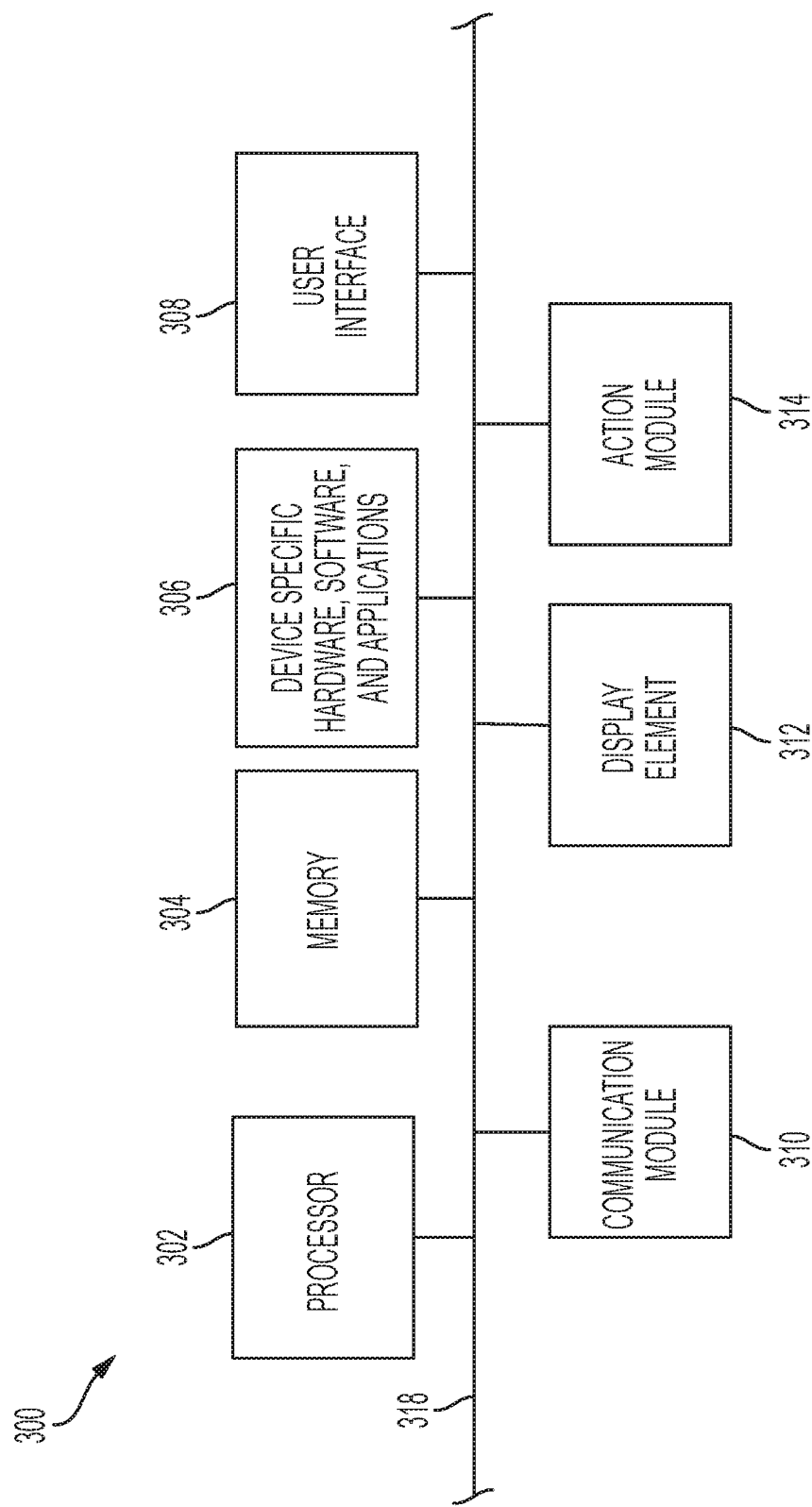
FIG. 3 is a schematic representation of an exemplary embodiment of user system suitable for use in a system such as that depicted in FIG. 1.

FIG. 3 is a schematic representation of an exemplary embodiment of user system 300 suitable for use in a system such as that depicted in FIG. 1. In practice, the user systems 110, 140 could be generally configured and implemented as shown in FIG. 3. Thus, the following general description of the user system 300 may be applicable to either one of the user systems 110, 140 of FIG. 1.

The illustrated embodiment of the user system 300 includes, without limitation: at least one processor 302; a suitable amount of memory 304; device-specific hardware, software, firmware, and/or applications 306; a user interface 308; a communication module 310; a display element 312; and an action module 314. Of course, the user system 300 may include additional elements, components, modules, and functionality configured to support various features that are unrelated to the subject matter described here. For example, the user system 300 may include certain features and elements to support conventional functions that might be related to the particular implementation and deployment of the user system 300. In practice, the elements of the user system 300 may be coupled together via a bus or any suitable interconnection architecture 318.

The processor 302 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 304 may be realized as RAM memory, flash memory, EPROM memory, EEPROM memory, registers, a hard disk, a removable disk, a CD-ROM, or any other form of storage medium known in the art. In this regard, the memory 304 can be coupled to the processor 302 such that the processor 302 can read information from, and write information to, the memory 304. In the alternative, the memory 304 may be integral to the processor 302. As an example, the processor 302 and the memory 304 may reside in an ASIC. The memory 304 can be used to store computer-readable media, where a tangible computer-readable medium has computer-executable instructions stored thereon. The computer-executable instructions, when read and executed by the user system 300, cause the user system 300 to perform certain tasks, operations, functions, and processes described in more detail herein. In this regard, the memory 304 may represent one suitable implementation of such computer-readable media. Alternatively, or additionally, the user system 300 could receive and cooperate with computer-readable media (not separately shown) that is realized as a portable or mobile component or platform, e.g., a portable hard drive, a USB flash drive, an optical disc, or the like.

The device-specific hardware, software, firmware, and applications 306 may vary from one embodiment of the user system 300 to another. For example, the device-specific hardware, software, firmware, and applications 306 will support telephone functions and features when the user system 300 is realized as a mobile telephone, conventional personal computer functions and features if the user system 300 is realized as a desktop or portable computer. In practice, certain portions or aspects of the device-specific hardware, software, firmware, and applications 306 may be implemented in one or more of the other blocks depicted in FIG. 3. As noted above, the applications can include, for example, an email application, a messaging application, a word processing application, a calendar application, a resource management application, a productivity application, scheduling application, a time management application, a collaboration application, an educational application, a social media application, an enterprise resource planning (ERP) application, a customer relationship management (CRM) application, a project management application, a spreadsheet application, database applications, a resource management application, etc. These are just a few non-limiting examples of the types of applications that could be local at the user system 300; however, it should also be appreciated that in other implementations the applications can be hosted at a remote application server and served to the user system 300.

The user interface 308 may include or cooperate with various features to allow a user to interact with the user system 300. Accordingly, the user interface 308 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the user system 300.

The communication module 310 facilitates data communication between the user system 300 and other components as needed during the operation of the user system 300. In the context of this description, the communication module 310 can be employed during an email interaction or communication session that includes the user system 300 as one of the participant devices. An embodiment of the user system 300 may support wireless data communication and/or wired data communication, using various data communication protocols. For example, the communication module could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394 (Firewire); hospital network communication protocols; and proprietary data communication protocols.

The display element 312 is suitably configured to enable the user system 300 to render and display various screens, graphical user interfaces (GUIs), drop down menus, auto-fill fields, text entry fields, message fields, or the like. Of course, the display element 312 may also be utilized for the display of other information during the operation of the user system 300, as is well understood. Notably, the specific configuration, operating characteristics, size, resolution, and functionality of the display element 312 can vary depending upon the practical implementation of the user system 300. For example, if the user system 300 is a desktop computer, then the display element 312 may be a relatively large monitor. Alternatively, if the user system 300 is a cellular telephone device (e.g., smartphone), then the display element 312 may be a relatively small integrated display screen, which may be realized as a touch screen.

The action module 314 represents the hardware, software, firmware, and/or processing logic that supports the various features and functions described herein that allow the user systems 110, 140 to execute an action in response to a command. In one embodiment, the action module 314 can be executed by the processor 302. An action can refer to a result of the command to automatically invoke certain functionality of an application, service or utility, for example, via an API call or a microservice. In certain non-limiting embodiments, the action module 314 can process commands and perform processing to automatically invoke actions by any type of application including any of those listed above. For example, an action can refer to automatically invoking functionality associated with an application (e.g., another application other than the application that the user is or was interacting with via the UI 112 to generate the input information 116). An action can automatically be invoked to automatically perform all tasks that would otherwise be associated with performing a task when using another application (e.g., opening features of another application, performing tasks associated with using features of another application, sending, receiving and/or processing information in accordance with features of another application, etc.).

Figure 4:
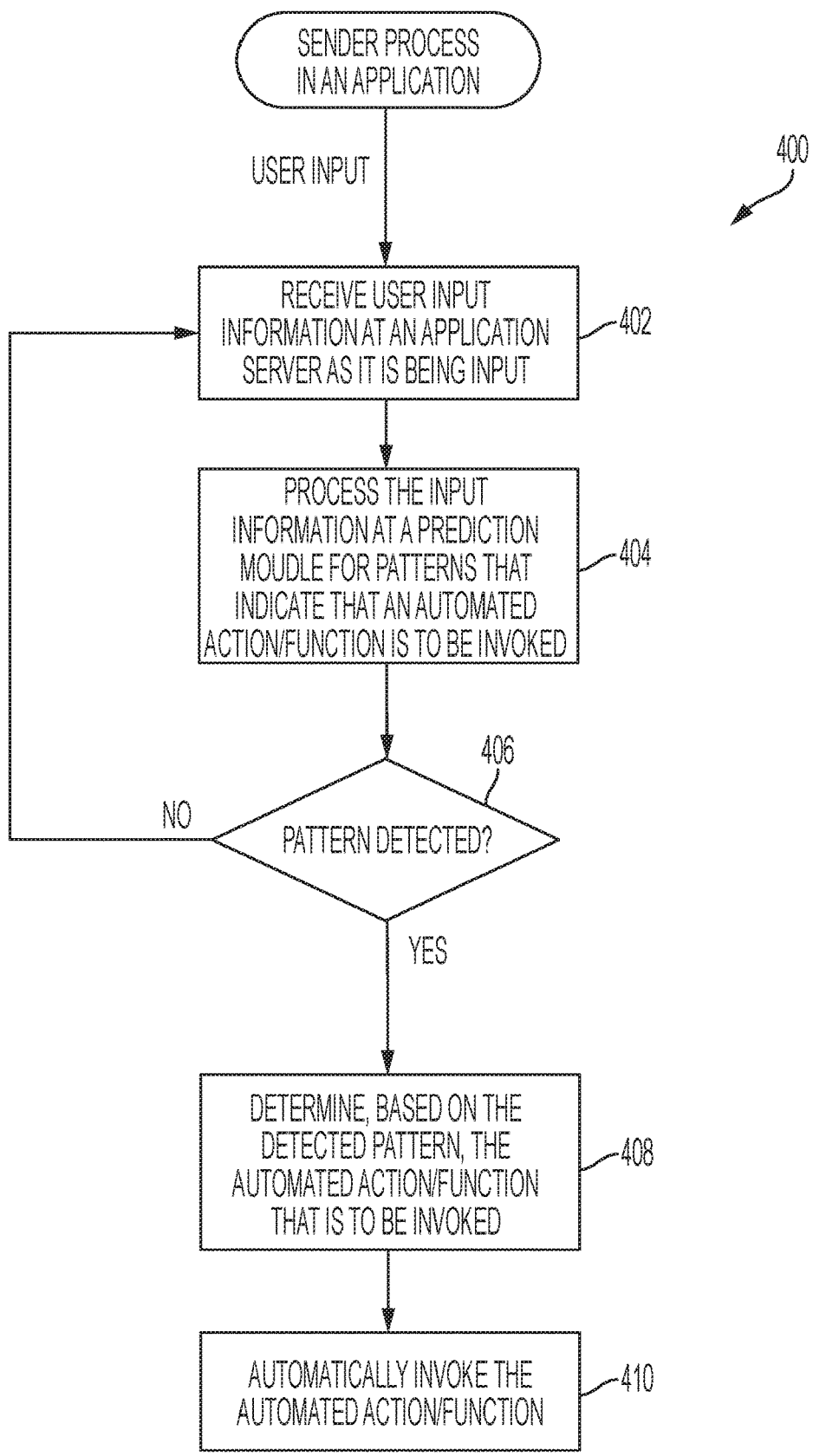
FIG. 4 is a flowchart that illustrates a method in accordance with the disclosed embodiments.

FIG. 4 is a flowchart that illustrates a method 400 in accordance with the disclosed embodiments. As a preliminary matter, it should be understood that steps of the method 400 are not necessarily limiting, and that steps can be added, omitted, and/or performed simultaneously without departing from the scope of the appended claims. It should be appreciated that the method 400 may include any number of additional or alternative tasks, that the tasks shown in FIG. 4 need not be performed in the illustrated order, and that the method 400 may be incorporated into a more comprehensive procedure or process having additional functionality not described in detail herein. Moreover, one or more of the tasks shown in FIG. 4 could be omitted from an embodiment of the method 400 as long as the intended overall functionality remains intact. It should also be understood that the illustrated method 400 can be stopped at any time. The method 400 is computer-implemented in that various tasks or steps that are performed in connection with the method 400 may be performed by software, hardware, firmware, or any combination thereof. For illustrative purposes, the following description of the method 400 may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIG. 4 that follows, the invoker module 122 of the application server 120, the action module 112 of the user system 110, and the action module 132 of server/database system 130 will be described as performing various acts, tasks or steps, but it should be appreciated that this refers to processing system(s) of the application server 120, the user system 110, and the server/database system 130 executing instructions of the various modules 122, 114, 132 to perform those various acts, tasks or steps. Depending on the implementation, the processing systems of the application server 120, the user system 110, and the server/database system 130 can be centrally located, or distributed among a number of systems that work together.

At 402, an application server 120 that hosts an invoker module 122 can receive user input information from a sender process in an application that is being executed at the user system 110. In one embodiment, the invoker module 122 can receive the user input information as it is being input in near real time. In another embodiment, the invoker module 122 can receive the user input information on a regular or periodic basis (e.g., every 2 seconds).

At 404, the invoker module 122 can process the input information at a prediction module 126 to detect patterns that indicate that an automated action or function is to be invoked. At 406, the invoker module 122 continuously monitors an input stream (of the input information) to detect a pattern in the input information, and the method 400 loops back to 402 until a pattern is detected.

When a pattern is detected by the invoker module 122, the method proceeds to 408, where the invoker module 122 determines, based on the pattern that was detected by the invoker module 122, an automated action or function that is to be invoked. As described above with reference to FIG. 1-3, the processing performed by the invoker module 122 at 408 varies depending on the implementation. At 410, the invoker module 122 can generate a command 129 that is sent to an action module, which can be hosted either at the user system, the application server 120, a separate server system, a separate database system or other computing component. The command is sent to a processing system to automatically invoke an action or function.

An example of one particular, non-limiting implementation of the system 100 of FIG. 1 will now be described with reference to FIGS. 5 and 6. In this implementation, an intelligent email module (e.g., an AI-based smart writing utility) is provided that includes an invoker module similar to that described above. In the example that will be described below with reference to FIGS. 5 and 6, the intelligent email module is implemented at an email server, but it should be appreciated that it could also be implemented at a user system or other system. As will be described in greater detail below, the intelligent email module processes textual information as it is entered into a user interface of an email application when the user is composing an email. The intelligent email module attempts to detect or identify certain predefined keywords (e.g., keywords preceded by a certain prefix such as @@) that might occur within the text of an email as it's being composed. When the intelligent email module detects or identifies one of the keywords, the intelligent email module interprets that keyword as a command to dynamically invoke particular functionality (e.g., invoke a library or function calls specific to the keyword action). The intelligent email module does this behind the scenes while the user continues to enter text and compose the email, and there is no observable change in the UI while the user continues to write their email. This way, no action is required by the user to invoke the functionality, and the user does not have to leave the context of the email application that they are working in at that time. This not only saves the user time, but also allows the user to maintain focus on the task at hand (composing the email) without having to open another application, or another feature/functionality within the email application, to perform additional tasks that occur to the user while composing the email.

Instead, this functionality (e.g., of another application or another feature of the email application) is automatically invoked for the user.

Figure 5:
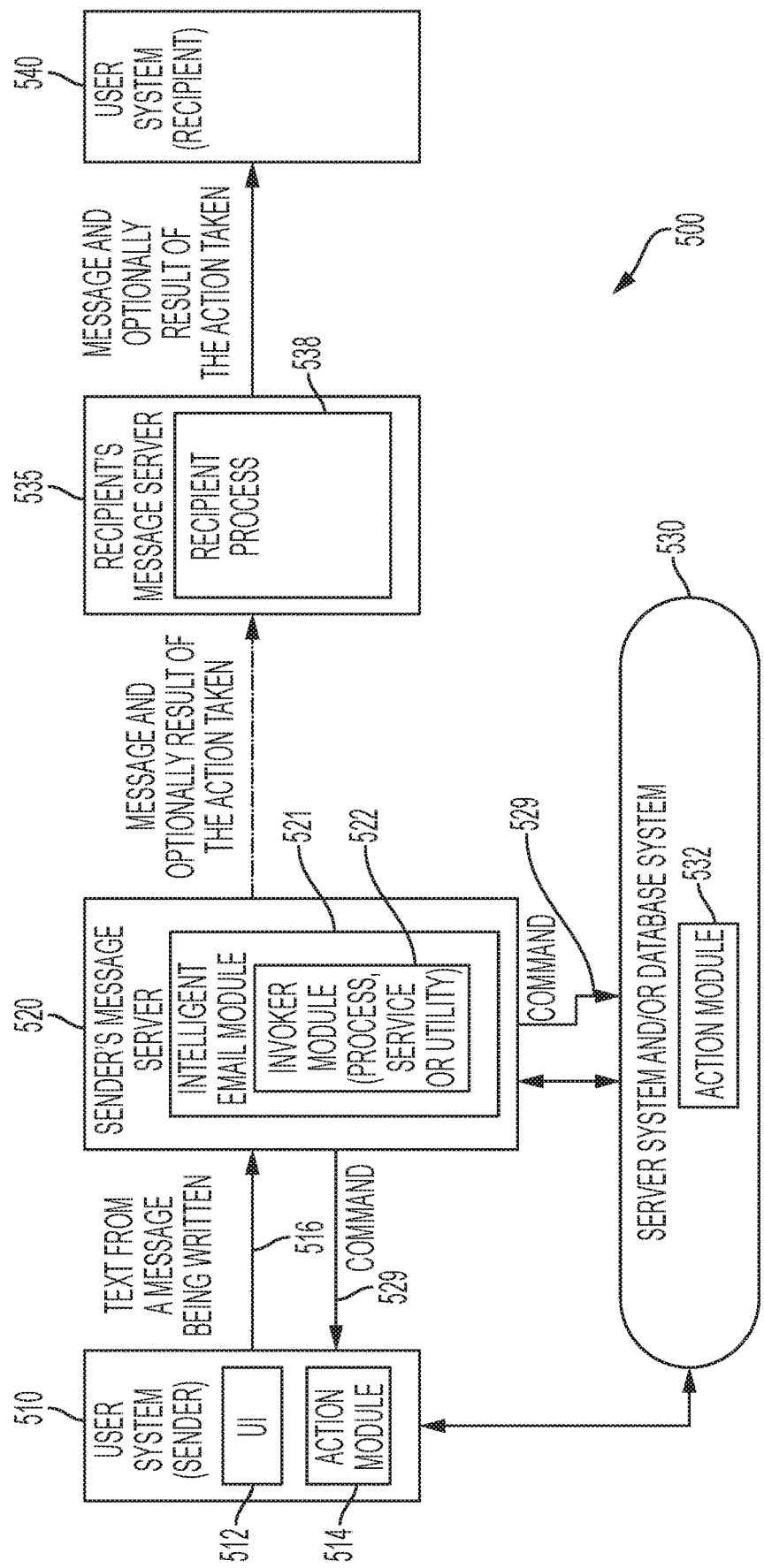
FIG. 5 is an example of a system in accordance with the disclosed embodiments.

FIG. 5 is an example of a system 500 in accordance with the disclosed embodiments. The system 500 includes a first user system 510, a first message server 520 (also referred to as the sender's message server), a second message server 535 (also referred to as the recipient's message server), a server/database system 530, and a second user system 540. Although the message servers 520, 535 and the server/database system 530 are shown separately, in another embodiment, the message servers 520, 535 and server/database system 530 can be implemented together as part of one system. For instance, the message servers 520, 535 can be part of the server/database system 530 in some implementations. The user systems and the server/database system 530 are generally described above with reference to FIG. 1; however, in this implementation, the primary application being used at user system 510 is an email application, and the application server is a message or email server 520.

As in FIG. 1, the first user system 510 includes a user interface (UI) 512 and an action module 514. As a user (not shown) of the first user system 510 interacts with an email application and composes an email addressed to one or more recipients, the user can input information into the email application via the UI 512 using any of the input devices described above with reference to FIG. 1. The email application that the user is interacting with can be served from the first message server 520, or in the alternative, could be hosted locally at the first user system 510.

As the user inputs textual information into a message being written using the email application, a sender process at the first user system 510 can send the textual information 516 to the sender's message server 520. The sender's message server 520 includes an intelligent email module 521 that can include an invoker module 522 such as that described above with reference to FIGS. 1-4. As noted above, in one embodiment, the invoker module 522 can be implemented as a process, service or utility at the message server 520, whereas in another embodiment, the invoker module 522 can be implemented locally as a process or utility at the user system 510 of the sender. Although not illustrated for sake of clarity, the invoker module 522 includes an extractor module, a prediction module, and a command generator module similar to the embodiment described with reference to FIG. 1. While both the extractor module and the prediction module can be implemented in one embodiment, in other embodiments either the extractor module or the prediction module can be implemented.

The extractor module can process the textual information 516 to extract a text string from the textual information 516, and then provide the extracted text to the command generator module. For example, in one implementation, the extractor module can process the textual information 516 and attempt to detect or identify a certain pre-fix that occurs before a text string and then extract the text string that follows. The command generator module can then can then generate, based on the extracted text sting, a command 529 by matching the extracted text sting to an entry in a file, library or database, where each entry is mapped to a corresponding command. Depending on the implementation, the corresponding command 529 can then be sent to either the action module 514 that is hosted at the first user system 510, or to the action module 532 that is hosted at the server/database system 530.

On the other hand, in another embodiment, the prediction module can process the textual information 516 to determine context of the textual information 516 (or contextual information). Then use, based on the contextual information, a bank of associative rules to generate a prediction result output (not shown). The prediction result output represents a predicted action for a given context. The prediction result output is sent to the command generator module, where it can be processed at the command generator module to generate a corresponding command 529 (e.g., a command that corresponds to that particular prediction result output). For example, in one implementation, the command generator module can generate, based on the prediction result output, a command 529 by matching the prediction result output to an entry in a file, library or database, where each entry is mapped to a corresponding command. Depending on the implementation, the corresponding command 529 can then be sent to either the action module 514 that is hosted at the first user system 510, or to the action module 532 that is hosted at the server/database system 530.

As in FIG. 1, the first user system 510 can include an action module 514 and/or the server/database system 530 can include an action module 532. Depending on the implementation, the command 529 can be sent to either the action module 514 that is hosted at the first user system 510, or to the action module 532 that is hosted at the server/database system 530. Both of the action modules 514, 532 operate in a similar manner in that they process the command 529 to generate an action that corresponds to the command. In other words, regardless of the implementation, either action module can then process the command 529 to generate an action that corresponds to the command.

For instance, the action module 532 at the server/database system 530 can process the command 529 to generate an action at the server/database system 530, or can process the command 529 to cause an action at either the first user system 510 or the message servers 520. Likewise, the action module 514 at the first user system 510 can process the command 529 to generate an action at first user system 510, or can process the command 529 to cause an action at either the message server 520 or the server/database system 530.

In either case, an action can refer to a result of executing the command to automatically invoke certain functionality of an application, service or utility, for example, via an API call or a microservice. For example, an action can refer to automatically invoking functionality associated with an application (e.g., another application other than the application that the user is or was interacting with via the UI 512 to generate the textual information 516). For instance, the action could be automatically causing an application to automatically invoke some functionality, such as, opening a window corresponding to the action and/or auto populating certain items associated within the window that corresponds to that action. As one non-limiting example, the window could be a window for a calendar application that is used to schedule a meeting, a window of an email application, such as a window to compose an email or a window used to attach a file to an email that is being written.

The user can continue to input textual information into the message being written using the email application and perform any other tasks associated with completing the email after the action has been automatically invoked by one of the action modules 514, 532. When the user is ready, the user can complete other tasks associated the functionality that was invoked by the action caused by the action module. In the example, where the action automatically caused an application to automatically open a window corresponding to the action and/or auto populated certain items associated within the window that corresponds to that action, the user can enter additional information in the window and complete the task. As shown in FIG. 5, the email message and optionally the result of the action taken can then be sent from the sender's message server 520 to a recipient process 538 at the recipient's message server 535, which can then forward the email message and the result of the action taken to the user system 540.

For example, in the example, where the action automatically caused a calendar application to automatically open a window to create a meeting invitation and/or auto populated certain items associated within that window, the user can navigate to that window, possibly enter additional information in that window, and the send a meeting invite to complete the task. However, in another scenario, the functionality associated with sending the meeting invite can be automatically performed by the action module. In other words, the action module can automatically generate the meeting invite with all of the required information included, and automatically send it on behalf of the user without the user having to do anything with respect to generating or sending the meeting invite.

As another non-limiting example, in the example, where the action automatically caused the email application to open another window to compose another email message from within the email application and/or auto populated certain items associated within that window, the user can navigate to that window, possibly enter additional information in that window, and the send another email message to complete the task. However, in another scenario, the functionality associated with generating and sending this additional email message can be automatically performed by the action module. In other words, the action module can automatically generate this additional email message with all of the required information that is to be included, and automatically send it on behalf of the user without the user having to do anything with respect to generating or sending this additional email message.

As another non-limiting example, in the example, where the action automatically caused the email application to open another window to search for and/or attach a file to an email that is being written within the email application, the user can navigate to that window, possibly select additional information in that window, and attached a file to the email message that is being written to complete the task. However, in another scenario, the functionality associated with searching for, selecting and attaching a file to the email message can be automatically performed by the action module. In other words, the action module can automatically search for, select and attach the file to the email message on behalf of the user without the user having to do anything with respect to searching for, selecting and attaching a file to the email message.

Additional non-limiting examples will be described below with reference to the examples that are shown in FIG. 7. In addition, some of the tasks performed by the various elements in FIG. 5 will be described in greater detail below with reference to FIG. 6. For example, certain operations performed by the user systems 510, 540, the message servers 520, 535 and the server/database system 530 will be described below. In that regard, FIG. 6 will be described with continued reference to FIGS. 1-5.

Figure 6:
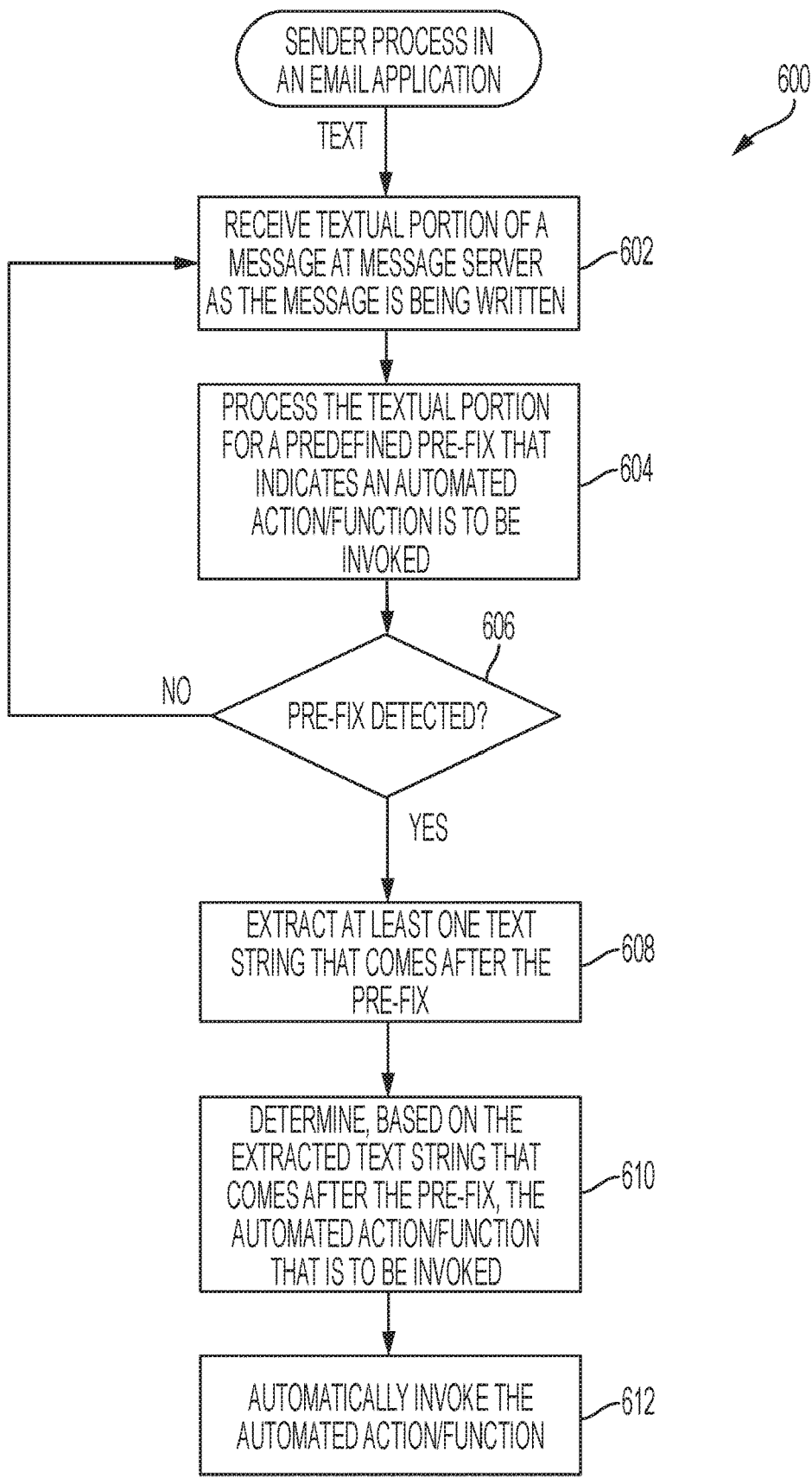
FIG. 6 is a flowchart that illustrates a method in accordance with the disclosed embodiments.

FIG. 6 is a flowchart that illustrates a method 600 in accordance with the disclosed embodiments. As a preliminary matter, it should be understood that steps of the method 600 are not necessarily limiting, and that steps can be added, omitted, and/or performed simultaneously without departing from the scope of the appended claims. It should be appreciated that the method 600 may include any number of additional or alternative tasks, that the tasks shown in FIG. 6 need not be performed in the illustrated order, and that the method 600 may be incorporated into a more comprehensive procedure or process having additional functionality not described in detail herein. Moreover, one or more of the tasks shown in FIG. 6 could be omitted from an embodiment of the method 600 as long as the intended overall functionality remains intact. It should also be understood that the illustrated method 600 can be stopped at any time. The method 600 is computer-implemented in that various tasks or steps that are performed in connection with the method 600 may be performed by software, hardware, firmware, or any combination thereof. For illustrative purposes, the following description of the method 600 may refer to elements mentioned above in connection with FIG. 5. In certain embodiments, some or all steps of this process, and/or substantially equivalent steps, are performed by execution of processor-readable instructions stored or included on a processor-readable medium. For instance, in the description of FIG. 6 that follows, the invoker module 522 of the message server 520, the action module 514 of the user system 510, and the action module 532 of server/database system 530 will be described as performing various acts, tasks or steps, but it should be appreciated that this refers to processing system(s) of the message server 520, the user system 510, and the server/database system 530 executing instructions of the various modules 522, 514, 532 to perform those various acts, tasks or steps. Depending on the implementation, the processing systems of the message server 520 and the server/database system 530 can be centrally located, or distributed among a number of systems that work together.

At 602, a message server 520 that hosts an invoker module 522 can receive textual information from an email message. In one implementation, the textual information is sent to an intelligent email module 521 from a sender process that is implemented as part of an email application that is being executed at the user system 510. In one embodiment, the invoker module 522 can receive the textual information as it is being input by the user in near real time. In another embodiment, the invoker module 522 can receive the textual information on a periodic basis (e.g., every 2 seconds).

At 604, the invoker module 522 can process the textual information and attempt to detect a pre-defined prefix (e.g., ## or @@ or && or **, etc.) that indicates that an automated action or function is to be invoked. At 606, the invoker module 522 continuously monitors the input stream (of the textual information) to detect a pre-defined pre-fix in the textual information. Until a pre-defined pre-fix is detected, the method 600 loops back to 602.

When a pre-defined pre-fix is detected by the invoker module 522, the method 600 proceeds to 608, where the invoker module 522 extracts at least one text sting that comes after the pre-defined pre-fix. At 610, the invoker module 522 can then determine, based on the text string that was extracted by the invoker module 522 (e.g., that follows or comes immediately after the pre-defined pre-fix), an automated action or function that is to be invoked. At 612, the invoker module 522 can generate a command 529 that is sent to an action module, which can be hosted either at the user system, the message server 520, a separate server system 530, a separate database system 530 or other computing component (not illustrated). The command is sent to a processing system to automatically invoke an action or function.

For example, "@@attach" can be a keyword to attach files to an email. When @@attach is encountered, the invoker module 522 can generate a command 529. The command 529 can include instructions for one or more function calls that can be invoked by the either the action module 514 or the action module 532 to return an action (e.g., attach available files) or it can be an argument to the parent function which in turn will attach a specified file.

FIG. 7 is a table that summarizes some non-limiting examples a primary application being used at user system, input information that is input into the primary application, and commands generated by invoker module to cause the action module to invoke an action in accordance of the disclosed embodiments.

As shown in row 2 of Table 1, where the primary application being used at user system is an email application, and the input information is indicative of a need to send an email to users A, B and C, the invoker module can generate a command to create new e-mail to addressed to users A, B and C, which causes the action module to invoke an action to open a new window with e-mail addressed to A, B and C.

As shown in row 3 of Table 1, where the primary application being used at user system is an email application, and the input information is indicative of a need to schedule a meeting with users A, B and C, the invoker module can generate a command to create new meeting invite addressed to users A, B and C, which causes the action module to invoke an action to open a new window with a meeting invite addressed to A, B and C.

As shown in row 4 of Table 1, where the primary application being used at user system is a word processing application, and the input information is indicative of a need to schedule a meeting with a contact named Joe Olsen at 11 AM on Jan. 1, 2019, the invoker module can generate a command to create new meeting invite addressed to Joe Olsen, which causes the action module to invoke an action to open a new window with a meeting invite for 11 AM on Jan. 1, 2019 that is addressed Joe Olsen.

As shown in row 5 of Table 1, where the primary application being used at user system is a word processing application, and the input information is indicative of a letter being written to a new, potential business contact, the invoker module can generate a command to create new a contact in a CRM system, which causes the action module to invoke an action to open a new window with a template for an contact object used for creating a contact in the CRM system with contact's name, address, and other information pre-populated using information extracted from the letter.

More complex actions can also be performed in some implementations. For example, as shown in row 6 of Table 1, where the primary application being used at user system is calendar application, and the input information is indicative of a need to schedule an appointment on Jan. 1, 2019 at 1 PM, the invoker module can generate a command to create new meeting invite on Jan. 1, 2019 at 1 PM, which causes the action module to invoke an action to open a new window with a meeting invite on Jan. 1, 2019 at 1 PM. The invoker module can also generate a command to open an existing meeting invite on Jan. 1, 2019 at 1 PM that conflicts with the new meeting invite, which causes the action module to invoke another action to open another window with an existing meeting invite scheduled on Jan. 1, 2019 at 1 PM with the option of cancelling or rescheduling the existing meeting with user's X and Y. The invoker module can also generate a command to open a new e-mail window, which causes the action module to invoke another action to open the new email window with information about the existing meeting invite that was scheduled on Jan. 1, 2019 at 1 PM addressed to users X and Y and that includes text informing the recipients of the need to reschedule the existing meeting with user's X and Y.

As shown in row 7 of Table 1, where the primary application being used at user system is a texting application on a user's smartphone, and the input information is indicative of a dinner meeting at 8 PM at Ruth's Chris steakhouse, the invoker module can generate a command to automatically generate a new meeting invite, which causes the action module to invoke an action to open a new window with a meeting invite addressed to an email address of the recipient of the text message, where the meeting invite is prepopulated with a map link inserted in the body of the meeting invite with the address of Ruth's Chris steakhouse and the time 8 PM.

The technologies describe above can be used to process input information that is input into a primary application, and automatically generate commands to cause an action module to automatically invoke an action in the same or another different application on behalf of a user. As noted above with reference to FIG. 1, in one implementation, these technologies can be used in conjunction with a cloud computing platform, such as a multitenant database system, that provides applications and services to multiple tenants or organizations via the cloud computing platform. One example of such a system will now be described below with reference to FIGS. 8-11.

Figure 8:
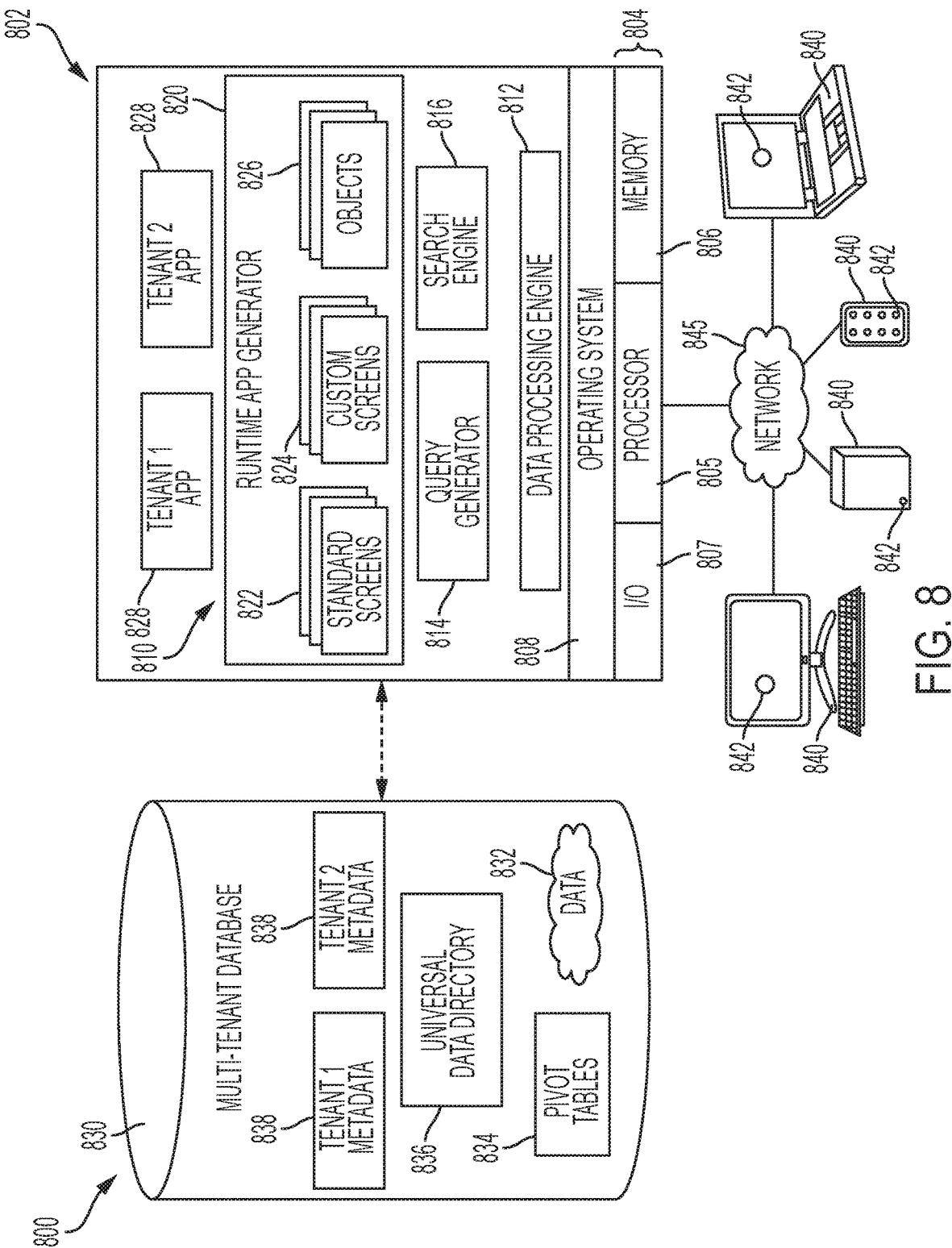
FIG. 8 is a schematic block diagram of an example of a multi-tenant computing environment in which features of the disclosed embodiments can be implemented in accordance with some of the disclosed embodiments.

FIG. 8 is a schematic block diagram of an example of a multi-tenant computing environment in which features of the disclosed embodiments can be implemented in accordance with the disclosed embodiments. As shown in FIG. 8, an exemplary cloud-based solution may be implemented in the context of a multi-tenant system 800 including a server 802 that supports applications 828 based upon data 832 from a database 830 that may be shared between multiple tenants, organizations, or enterprises, referred to herein as a multi-tenant database. The multi-tenant system 800 can be shared by many different organizations, and handles the storage of, and access to, different metadata, objects, data and applications across disparate organizations. In one embodiment, the multi-tenant system 800 can be part of a database system, such as a multi-tenant database system.

The multi-tenant system 800 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 800 allows users of user systems 840 to establish a communicative connection to the multi-tenant system 800 over a network 845 such as the Internet or any type of network described herein. Based on a user's interaction with a user system 840, the application platform 810 accesses an organization's data (e.g., records held by an object) and metadata that is stored at one or more database systems 830, and provides the user system 840 with access to applications based on that data and metadata. These applications are executed or run in a process space of the application platform 810 will be described in greater detail below. The user system 840 and various other user systems (not illustrated) can interact with the applications provided by the multi-tenant system 800. The multi-tenant system 800 is configured to handle requests for any user associated with any organization that is a tenant of the system. Data and services generated by the various applications 828 are provided via a network 845 to any number of user systems 840, such as desktops, laptops, tablets, smartphones or other client devices, Google Glass™, and any other computing device implemented in an automobile, aircraft, television, or other business or consumer electronic device or system, including web clients.

Each application 828 is suitably generated at run-time (or on-demand) using a common application platform 810 that securely provides access to the data 832 in the database 830 for each of the various tenant organizations subscribing to the system 800. The application platform 810 has access to one or more database systems 830 that store information (e.g., data and metadata) for a number of different organizations including user information, organization information, custom information, etc. The database systems 830 can include a multi-tenant database system 830 as described with reference to FIG. 8, as well as other databases or sources of information that are external to the multi-tenant database system 830 of FIG. 8. In accordance with one non-limiting example, the service cloud 800 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 830. In this regard, each tenant includes one or more users and/or groups associated with, authorized by, or otherwise belonging to that respective tenant. Stated another way, each respective user within the multi-tenant system 800 is associated with, assigned to, or otherwise belongs to a particular one of the plurality of enterprises supported by the system 800.

Each enterprise tenant may represent a company, corporate department, business or legal organization, and/or any other entities that maintain data for particular sets of users (such as their respective employees or customers) within the multi-tenant system 800. Although multiple tenants may share access to the server 802 and the database 830, the particular data and services provided from the server 802 to each tenant can be securely isolated from those provided to other tenants. The multi-tenant architecture therefore allows different sets of users to share functionality and hardware resources without necessarily sharing any of the data 832 belonging to or otherwise associated with other organizations.

The multi-tenant database 830 may be a repository or other data storage system capable of storing and managing the data 832 associated with any number of tenant organizations. The database 830 may be implemented using conventional database server hardware. In various embodiments, the database 830 shares processing hardware 804 with the server 802. In other embodiments, the database 830 is implemented using separate physical and/or virtual database server hardware that communicates with the server 802 to perform the various functions described herein.

In an exemplary embodiment, the database 830 includes a database management system or other equivalent software capable of determining an optimal query plan for retrieving and providing a particular subset of the data 832 to an instance of application (or virtual application) 828 in response to a query initiated or otherwise provided by an application 828, as described in greater detail below. The multi-tenant database 830 may alternatively be referred to herein as an on-demand database, in that the database 830 provides (or is available to provide) data at run-time to on-demand virtual applications 828 generated by the application platform 810, as described in greater detail below.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants.

Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 may be implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like.

The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short-term or long-term storage or other computer-readable media capable of storing programming instructions for execution on the processor 805, including any sort of random-access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or platform, e.g., a portable hard drive, a USB flash drive, an optical disc, or the like.

The server 802, application platform 810 and database systems 830 can be part of one backend system. Although not illustrated, the multi-tenant system 800 can include other backend systems that can include one or more servers that work in conjunction with one or more databases and/or data processing components, and the application platform 810 can access the other backend systems.

The multi-tenant system 800 includes one or more user systems 840 that can access various applications provided by the application platform 810. The application platform 810 is a cloud-based user interface. The application platform 810 can be any sort of software application or other data processing engine that generates the virtual applications 828 that provide data and/or services to the user systems 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the user systems 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the user systems 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its user system 840, as appropriate.

The runtime application generator 820 suitably interacts with the query generator 814 to efficiently obtain multi-tenant data 832 from the database 830 as needed in response to input queries initiated or otherwise provided by users of the user systems 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request.

With continued reference to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled user system 840 on the network 845. In an exemplary embodiment, the user system 840 includes a display device, such as a monitor, screen, or another conventional electronic display capable of graphically presenting data and/or information retrieved from the multi-tenant database 830, as described in greater detail below.

Typically, the user operates a conventional browser application or other client program 842 executed by the user system 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. However, if a user chooses to manually upload an updated file (through either the web-based user interface or through an API), it will also be shared automatically with all of the users/devices that are designated for sharing.

As noted above, the virtual application 828 may contain Java, ActiveX, or other content that can be presented using conventional client software running on the user system 840; other embodiments may simply provide dynamic web or other content that can be presented and viewed by the user, as desired. As described in greater detail below, the query generator 814 suitably obtains the requested subsets of data 832 from the database 830 as needed to populate the tables, reports or other features of the particular virtual application 828.

Objects and Records

In one embodiment, the multi-tenant database system 830 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

An account object may include information about an organization or person (such as customers, competitors, and partners) involved with a particular business. Each object may be associated with fields. For example, an account object may include fields such as "company", "zip", "phone number", "email address", etc. A contact object may include contact information, where each contact may be an individual associated with an "account". A contact object may include fields such as "first name", "last name", "phone number", "accountID", etc. The "accountID" field of the "contact" object may be the ID of the account that is the parent of the contact. An opportunities object includes information about a sale or a pending deal. An opportunities object may include fields such as "amount", "accountID", etc. The "accountID" field of the "opportunity" object may be the ID of the account that is associated with the opportunity. Each field may be associated with a field value. For example, a field value for the "zip" field may be "94105".

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

The following description is of one example of a system in which the features described above may be implemented. The components of the system described below are merely one example and should not be construed as limiting. The features described above may be implemented in any other type of computing environment, such as one with multiple servers, one with a single server, a multi-tenant server environment, a single-tenant server environment, or some combination of the above.

Figure 9:
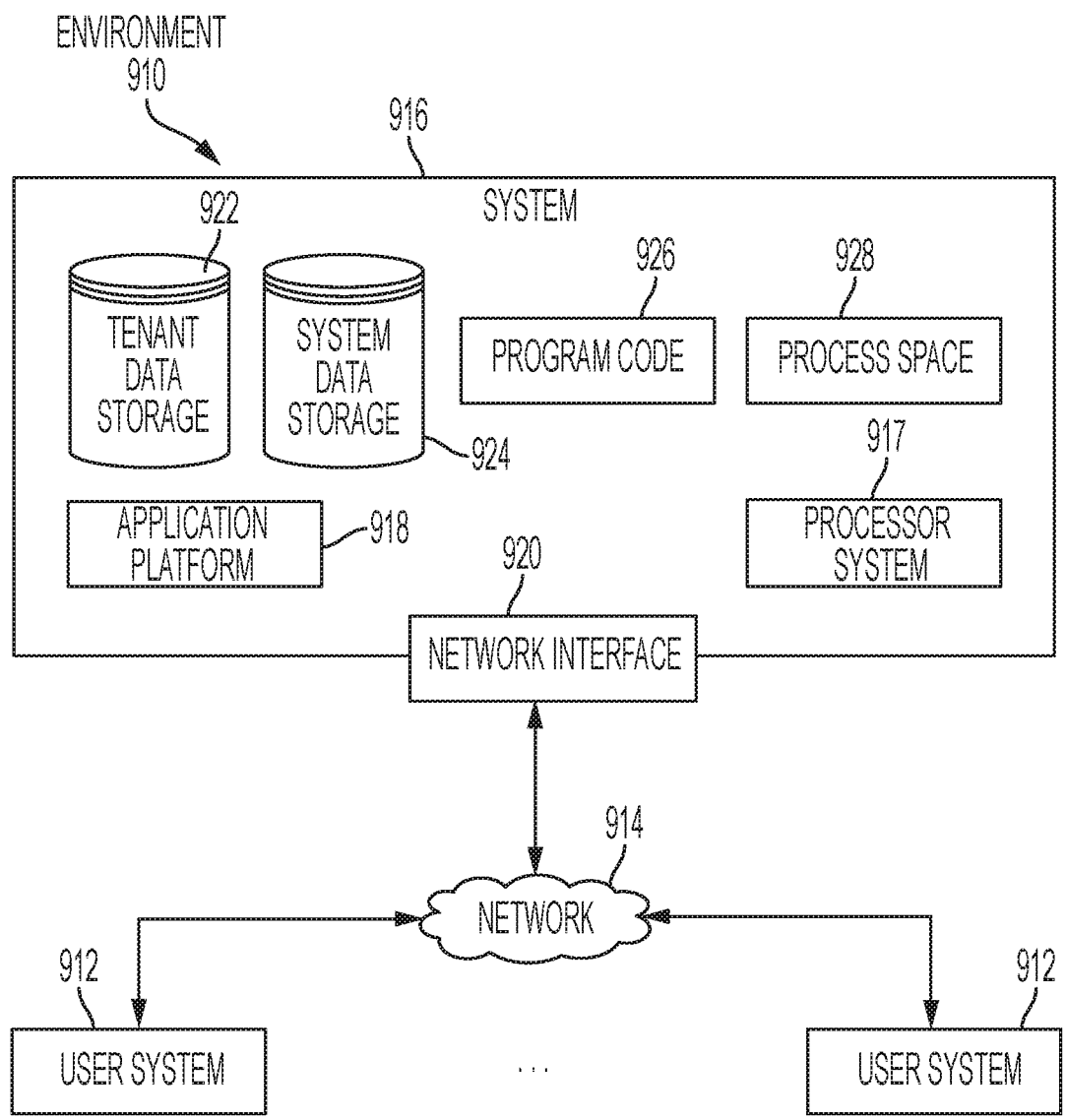
FIG. 9 is a block diagram that illustrates an example of an environment in which an on-demand database service can be used in accordance with some implementations.

FIG. 9 shows a block diagram of an example of an environment 910 in which an on-demand database service can be used in accordance with some implementations. The environment 910 includes user systems 912, a network 914, a database system 916 (also referred to herein as a "cloud-based system"), a processor system 917, an application platform 918, a network interface 920, tenant database 922 for storing tenant data 923, system database 924 for storing system data 925, program code 926 for implementing various functions of the system 916, and process space 928 for executing database system processes and tenant-specific processes, such as running applications as part of an application hosting service. In some other implementations, environment 910 may not have all of these components or systems, or may have other components or systems instead of, or in addition to, those listed above.

In some implementations, the environment 910 is an environment in which an on-demand database service exists. An on-demand database service, such as that which can be implemented using the system 916, is a service that is made available to users outside of the enterprise(s) that own, maintain or provide access to the system 916. As described above, such users generally do not need to be concerned with building or maintaining the system 916. Instead, resources provided by the system 916 may be available for such users' use when the users need services provided by the system 916; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 918 can be a framework that allows the applications of system 916 to execute, such as the hardware or software infrastructure of the system 916. In some implementations, the application platform 918 enables the creation, management and execution of one or more applications developed by the provider of the on-demand database service, users accessing the on-demand database service via user systems 912, or third-party application developers accessing the on-demand database service via user systems 912.

In some implementations, the system 916 implements a web-based customer relationship management (CRM) system. For example, in some such implementations, the system 916 includes application servers configured to implement and execute CRM software applications as well as provide related data, code, forms, renderable webpages and documents and other information to and from user systems 912 and to store to, and retrieve from, a database system related data, objects, and Webpage content. In some MTS implementations, data for multiple tenants may be stored in the same physical database object in tenant database 922. In some such implementations, tenant data is arranged in the storage medium(s) of tenant database 922 so that data of one tenant is kept logically separate from that of other tenants so that one tenant does not have access to another tenant's data, unless such data is expressly shared. The system 916 also implements applications other than, or in addition to, a CRM application. For example, the system 916 can provide tenant access to multiple hosted (standard and custom) applications, including a CRM application. User (or third-party developer) applications, which may or may not include CRM, may be supported by the application platform 918. The application platform 918 manages the creation and storage of the applications into one or more database objects and the execution of the applications in one or more virtual machines in the process space of the system 916.

According to some implementations, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 914 can be or include any network or combination of networks of systems or devices that communicate with one another. For example, the network 914 can be or include any one or any combination of a LAN (local area network), WAN (wide area network), telephone network, wireless network, cellular network, point-to-point network, star network, token ring network, hub network, or other appropriate configuration. The network 914 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 912 can communicate with system 916 using TCP/IP and, at a higher network level, other common Internet protocols to communicate, such as HTTP, FTP, AFS, WAP, etc. In an example where HTTP is used, each user system 912 can include an HTTP client commonly referred to as a "web browser" or simply a "browser" for sending and receiving HTTP signals to and from an HTTP server of the system 916. Such an HTTP server can be implemented as the sole network interface 920 between the system 916 and the network 914, but other techniques can be used in addition to or instead of these techniques. In some implementations, the network interface 920 between the system 916 and the network 914 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 912 can be implemented as any computing device(s) or other data processing apparatus or systems usable by users to access the database system 916. For example, any of user systems 912 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 912 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 916) of the user system 912 to access, process and view information, pages and applications available to it from the system 916 over the network 914.

Each user system 912 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 912 in conjunction with pages, forms, applications and other information provided by the system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 912 may differ in their respective capacities, and the capacity of a particular user system 912 can be entirely determined by permissions (permission levels) for the current user of such user system. For example, where a salesperson is using a particular user system 912 to interact with the system 916, that user system can have the capacities allotted to the salesperson. However, while an administrator is using that user system 912 to interact with the system 916, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 912 and some or all of its components are operator-configurable using applications, such as a browser, including computer code executed using a central processing unit (CPU) such as an Intel Pentium® processor or the like. Similarly, the system 916 (and additional instances of an MTS, where more than one is present) and all of its components can be operator-configurable using application(s) including computer code to run using the processor system 917, which may be implemented to include a CPU, which may include an Intel Pentium® processor or the like, or multiple CPUs.

The system 916 includes tangible computer-readable media having non-transitory instructions stored thereon/in that are executable by or used to program a server or other computing system (or collection of such servers or computing systems) to perform some of the implementation of processes described herein. For example, computer program code 926 can implement instructions for operating and configuring the system 916 to intercommunicate and to process webpages, applications and other data and media content as described herein. In some implementations, the computer code 926 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 10:
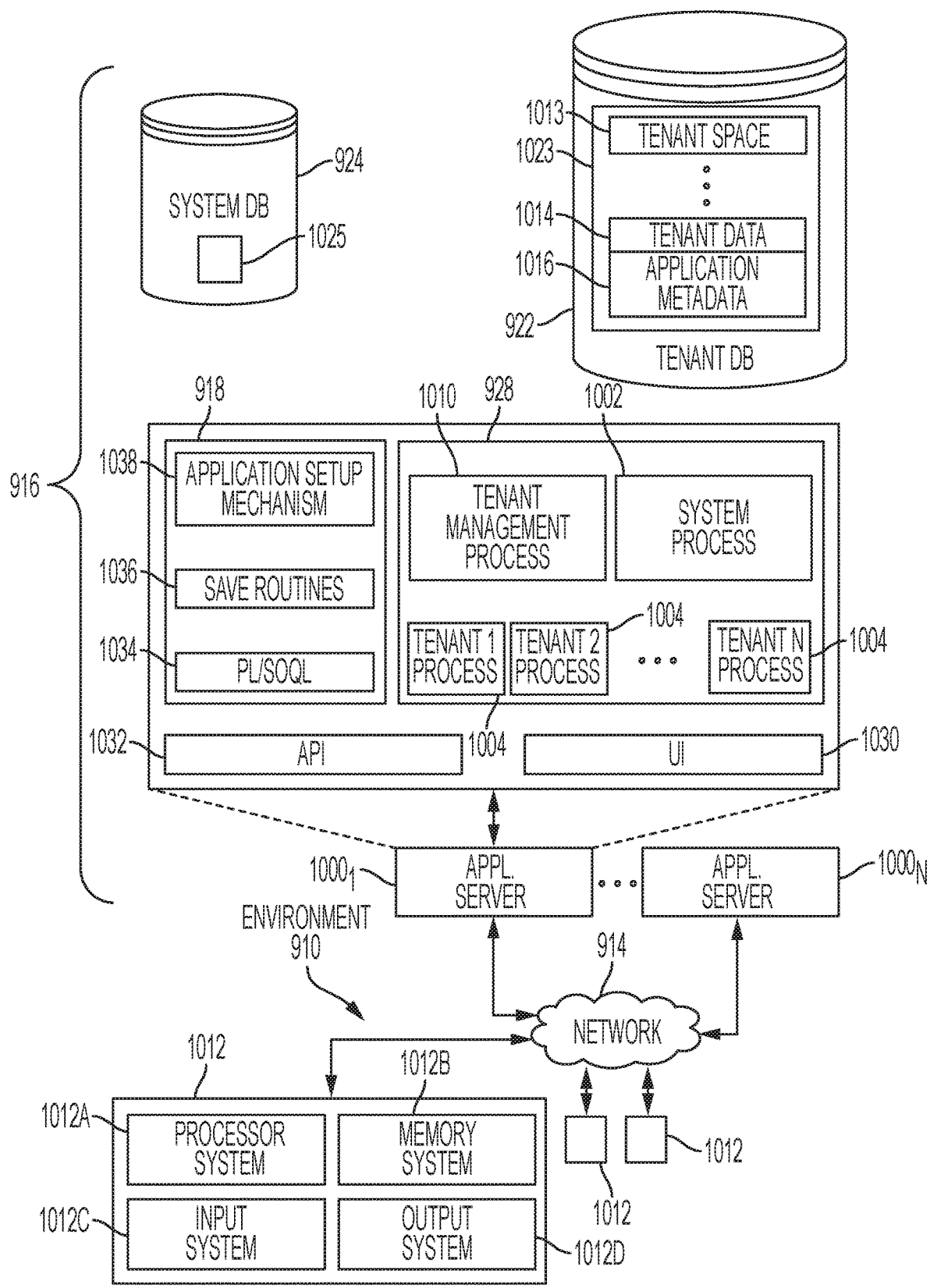
FIG. 10 is a block diagram that illustrates example implementations of elements of FIG. 9 and example interconnections between these elements according to some implementations.

FIG. 10 shows a block diagram of example implementations of elements of FIG. 9 and example interconnections between these elements according to some implementations. That is, FIG. 10 also illustrates environment 910, but FIG. 10, various elements of the system 916 and various interconnections between such elements are shown with more specificity according to some more specific implementations. Elements from FIG. 9 that are also shown in FIG. 10 will use the same reference numbers in FIG. 10 as were used in FIG. 9. Additionally, in FIG. 10, the user system 912, which is renumbered in FIG. 10 as user system 1012, includes a processor system 1012A, a memory system 1012B, an input system 1012C, and an output system 1012D. The processor system 1012A can include any suitable combination of one or more processors. The memory system 1012B can include any suitable combination of one or more memory devices. The input system 1012C can include any suitable combination of input devices, such as one or more touchscreen interfaces, keyboards, mice, trackballs, scanners, cameras, or interfaces to networks. The output system 1012D can include any suitable combination of output devices, such as one or more display devices, printers, or interfaces to networks.

In FIG. 10, the network interface 920 of FIG. 9 is implemented as a set of HTTP application servers $1000_1$-$1000_N$. Each application server 1000, also referred to herein as an "app server," is configured to communicate with tenant database 922 and the tenant data 1023 therein, as well as system database 924 and the system data 1025 therein, to serve requests received from the user systems 1012. The tenant data 1023 can be divided into individual tenant storage spaces 1013, which can be physically or logically arranged or divided. Within each tenant storage space 1013, tenant data 1014 and application metadata 1016 can similarly be allocated for each user. For example, a copy of a user's most recently used (MRU) items can be stored to user storage 1014. Similarly, a copy of MRU items for an entire organization that is a tenant can be stored to tenant storage space 1013.

The process space 928 includes system process space 1002, individual tenant process spaces 1004 and a tenant management process space 1010. The application platform 918 includes an application setup mechanism 1038 that supports application developers' creation and management of applications. Such applications and others can be saved as metadata into tenant database 922 by save routines 1036 for execution by subscribers as one or more tenant process spaces 1004 managed by tenant management process 1010, for example. Invocations to such applications can be coded using PL/SOQL 1034, which provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 916 for the subscriber making the invocation and executing the metadata as an application in a virtual machine.

The system 916 of FIG. 10 also includes a user interface (UI) 1030 and an application programming interface (API) 1032 to system 916 resident processes to users or developers at user systems 1012. In some other implementations, the environment 910 may not have the same elements as those listed above or may have other elements instead of, or in addition to, those listed above.

Each application server 1000 can be communicably coupled with tenant database 922 and system database 924, for example, having access to tenant data 1023 and system data 1025, respectively, via a different network connection. For example, one application server $1000_1$ can be coupled via the network 914 (for example, the Internet), another application server $1000_N$ can be coupled via a direct network link, and another application server (not illustrated) can be coupled by yet a different network connection. Transfer Control Protocol and Internet Protocol (TCP/IP) are examples of typical protocols that can be used for communicating between application servers 1000 and the system 916. However, it will be apparent to one skilled in the art that other transport protocols can be used to optimize the system 916 depending on the network interconnections used.

In some implementations, each application server 1000 is configured to handle requests for any user associated with any organization that is a tenant of the system 916. Because it can be desirable to be able to add and remove application servers 1000 from the server pool at any time and for various reasons, in some implementations there is no server affinity for a user or organization to a specific application server 1000. In some such implementations, an interface system implementing a load balancing function (for example, an F5 Big-IP load balancer) is communicably coupled between the application servers 1000 and the user systems 1012 to distribute requests to the application servers 1000. In one implementation, the load balancer uses a least-connections algorithm to route user requests to the application servers 1000. Other examples of load balancing algorithms, such as round robin and observed-response-time, also can be used. For example, in some instances, three consecutive requests from the same user could hit three different application servers 1000, and three requests from different users could hit the same application server 1000. In this manner, by way of example, system 916 can be a multi-tenant system in which system 916 handles storage of, and access to, different objects, data and applications across disparate users and organizations.

In one example storage use case, one tenant can be a company that employs a sales force where each salesperson uses system 916 to manage aspects of their sales. A user can maintain contact data, leads data, customer follow-up data, performance data, goals and progress data, etc., all applicable to that user's personal sales process (for example, in tenant database 922). In an example of an MTS arrangement, because all of the data and the applications to access, view, modify, report, transmit, calculate, etc., can be maintained and accessed by a user system 1012 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 916 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 916 also can maintain system level data usable by multiple tenants or other data. Such system level data can include industry reports, news, postings, and the like that are sharable among tenants.

In some implementations, the user systems 1012 (which also can be client systems) communicate with the application servers 1000 to request and update system-level and tenant-level data from the system 916. Such requests and updates can involve sending one or more queries to tenant database 922 or system database 924. The system 916 (for example, an application server 1000 in the system 916) can automatically generate one or more SQL statements (for example, one or more SQL queries) designed to access the desired information. System database 924 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11:
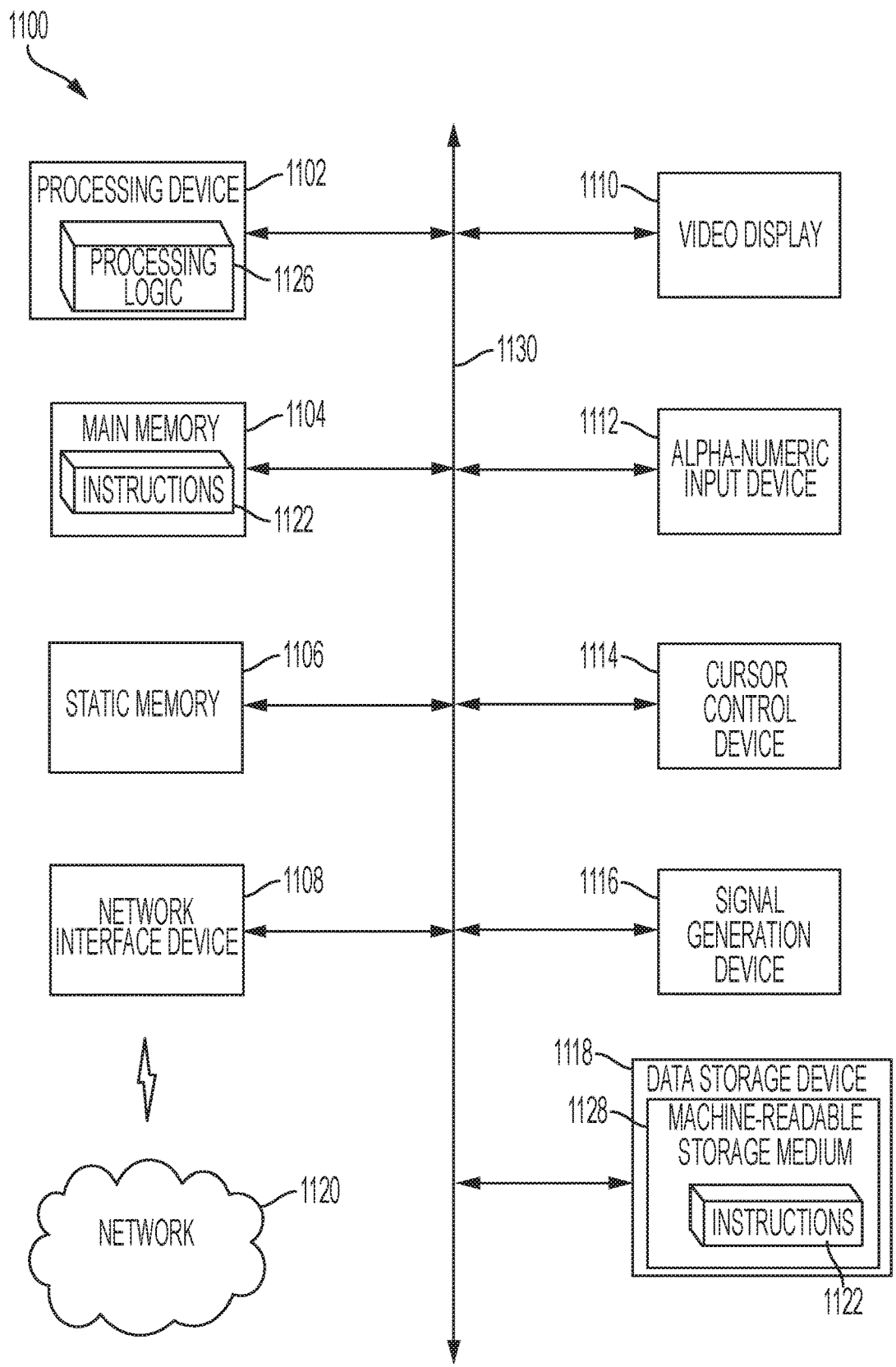
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may represent the user systems 110, 140, the application server 120, the server system 130, or the database system 130 of FIG. 1.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," " in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for automatically determining a need to invoke functionality of a feature of an application while using a primary application and for automatically invoking that functionality without user action, the system comprising:
    a user system that is configured to execute the primary application and to receive input information that is input into the primary application via a user interface; and
    an application server system communicatively coupled to the user system, the application server system comprising:
        at least one hardware-based processing system and memory, wherein the memory comprises processor-executable instructions encoded on a non-transient processor-readable media, wherein the processor-executable instructions, when executed by the at least one hardware-based processing system, are configurable to cause:
            receiving the input information from a sender process at the user system;
            processing of the input information to extract a text string from the input information and to determine contextual information from the input information, wherein the text string comprises extracted text;
            using a set of associative rules to generate a prediction result output that corresponds to the contextual information for a given context;
            generating based on the extracted text and the prediction result output, a command to automatically invoke functionality of the feature of the application without user action, wherein the command corresponds to the prediction result output and is generated by matching the prediction result output to an entry in a library that is mapped to the command; and
            executing the command to generate an action that automatically invokes the functionality of the feature of the application without user action.

2. The system according to claim 1, wherein the processor-executable instructions, when executed by the at least one hardware-based processing system, are further configurable to cause:
    extracting patterns from the contextual information that indicate that functionality of the feature of the application is to be invoked;
    evaluating each of the set of associative rules by determining whether extracted patterns from the contextual information match a pattern defined by associative data for that associative rule; and
    using one of the associative rules, that is identified as having a matching pattern with the patterns from the contextual information, to generate the prediction result output.

3. The system according to claim 1, wherein the executing the command to generate an action that automatically invokes the functionality of the feature of the application without user action is executed at the user system, or at a server system, or at a database system to cause the action, wherein the action is a result of processing the command to automatically invoke certain functionality of the feature of the application by an API call or a microservice.

4. The system according to claim 1, wherein the processor-executable instructions, when executed by the at least one hardware-based processing system, are further configurable to cause:
    identifying a pre-fix that occurs before the text string, wherein the pre-fix serves as a signal that information that follows that pre-fix indicates the functionality that needs to be automatically invoked;
    extracting the text string that follows the pre-fix by performing a matching analysis against a library of keywords and extracting a matching keyword; and
    generating, based on the matching keyword, a command to automatically invoke the functionality of the feature of the application without user action by matching the matching keyword to an entry that is mapped to the command.

5. The system according to claim 1, wherein the feature of the application is a feature of the primary application.

6. The system according to claim 1, wherein the feature of the application is a feature of another application that is different than the primary application.

7. The system according to claim 1, wherein the functionality of the feature of the application that is automatically invoked by the action includes:
  automatically opening a window of the application; and
  auto-populating certain items within the window with information to help expedite completion of a task.

8. A method for automatically determining a need to invoke functionality of a feature of an application while using a primary application and for automatically invoking that functionality without user action, the method comprising:
  receiving input information from a sender process at a user system, wherein the input information is input into a primary application via a user interface of the user system;
  at a hardware-based processing system of an application server system that is communicatively coupled to the user system:
    processing the input information to extract a text string from the input information and to determine contextual information from the input information, wherein the text string comprises extracted text;
    using a set of associative rules to generate a prediction result output that corresponds to the contextual information for a given context; and
    generating, based on the extracted text and the prediction result output, a command to automatically invoke functionality of the feature of the application without user action wherein the command corresponds to the prediction result output and is generated by matching the prediction result output to an entry in a library that is mapped to the command; and
    executing the command, at another hardware-based processing system, to generate an action that automatically invokes the functionality of the feature of the application without user action.

9. The method according to claim 8, wherein using a set of associative rules to generate a prediction result output that corresponds to the contextual information for a given context, comprises:
  extracting patterns from the contextual information that indicate that functionality of the feature of the application is to be invoked;
  evaluating each of the set of associative rules by determining whether extracted patterns from the contextual information match a pattern defined by associative data for that associative rule; and
  using one of the associative rules, that is identified as having a matching pattern with the patterns from the contextual information, to generate the prediction result output.

10. The method according to claim 8, further comprising:
  identifying a pre-fix that occurs before the text string, wherein the pre-fix serves as a signal that information that follows that pre-fix indicates the functionality that needs to be automatically invoked;
  extracting the text string that follows the pre-fix by performing a matching analysis against a library of keywords and extracting a matching keyword; and
  generating the command to automatically invoke the functionality of the feature of the application without user action by matching the matching keyword to an entry that is mapped to the command.

11. The method according to claim 8, wherein the feature of the application is a feature of the primary application.

12. The method according to claim 8, wherein the feature of the application is a feature of another application that is different than the primary application.

13. The method according to claim 8, wherein the functionality of the feature of the application that is automatically invoked by the action includes:
  automatically opening a window of the application; and
  auto-populating certain items within the window with information to help expedite completion of a task.

14. A system comprising at least one hardware-based processor and memory, wherein the memory comprises processor-executable instructions encoded on a non-transient processor-readable media, wherein the processor-executable instructions, when executed by the at least one hardware-based processor, are configurable to cause:
  receiving input information from a sender process at a user system, wherein the input information is input into a primary application via a user interface of the user system;
  processing the input information to extract a text string from the input information and to determine contextual information from the input information, wherein the text string comprises extracted text;
  using a set of associative rules to generate a prediction result output that corresponds to the contextual information for a given context;
  generating, based on the extracted text and the prediction result output, a command to automatically invoke functionality of a feature of an application without user action, wherein the command corresponds to the prediction result output and is generated by matching the prediction result output to an entry in a library that is mapped to the command; and
  executing the command to generate an action that automatically invokes the functionality of the feature of the application without user action.

15. The system according to claim 14, wherein using a set of associative rules to generate a prediction result output that corresponds to the contextual information for a given context, comprises:
  extracting patterns from the contextual information that indicate that functionality of the feature of the application is to be invoked;
  evaluating each of the set of associative rules by determining whether extracted patterns from the contextual information match a pattern defined by associative data for that associative rule; and
  using one of the associative rules, that is identified as having a matching pattern with the patterns from the contextual information, to generate the prediction result output.

16. The system according to claim 14, wherein the processor-executable instructions, when executed by the at least one hardware-based processor, are further configurable to cause:
  identifying a pre-fix that occurs before the text string, wherein the pre-fix serves as a signal that information that follows that pre-fix indicates the functionality that needs to be automatically invoked; and
  extracting the text string that follows the pre-fix by performing a matching analysis against a library of keywords and extracting a matching keyword; and
  generating the command to automatically invoke the functionality of the feature of the application without user action by matching the matching keyword to an entry that is mapped to the command.

17. The system according to claim 14, wherein the functionality of the feature of the application that is automatically invoked by the action includes:
   automatically opening a window of the application; and
   auto-populating certain items within the window with information to help expedite completion of a task.

* * * * *